(12) United States Patent
Gu et al.

(10) Patent No.: US 12,722,735 B2
(45) Date of Patent: Sep. 1, 2026

(54) SHOCK-ABSORBING DEVICE FOR FORK OF BICYCLE

(71) Applicant: TIEN HSIN INDUSTRIES CO., LTD., Taichung City (TW)

(72) Inventors: Fong-Syuan Gu, Taichung City (TW); Kuang-Yang Liao, Taichung City (TW)

(73) Assignee: TIEN HSIN INDUSTRIES CO., LTD., Taichung City (TW)

( * ) Notice: Subject to any disclaimer, the term of this patent is extended or adjusted under 35 U.S.C. 154(b) by 232 days.

(21) Appl. No.: 18/783,431

(22) Filed: Jul. 25, 2024

(65) Prior Publication Data

US 2026/0028088 A1 Jan. 29, 2026

(51) Int. Cl.
*B62K 25/08* (2006.01)

(52) U.S. Cl.
CPC .................................... *B62K 25/08* (2013.01)

(58) Field of Classification Search
CPC ......... B62K 25/08; B62K 21/20; B62K 21/18
See application file for complete search history.

(56) References Cited

U.S. PATENT DOCUMENTS 9,926,033 B1 * 3/2018 Tsai ........................ B62K 21/20
2023/0399074 A1 * 12/2023 Tsai ........................ B62K 21/14
2025/0128783 A1 * 4/2025 Dunlap .................... B62J 11/13

FOREIGN PATENT DOCUMENTS

DE 202025106606 U1 * 12/2025 ............. B62K 21/20
EP 3552940 A1 * 10/2019 ............. B62K 21/14
GB 2496671 A * 5/2013 ............. B62K 21/22
WO WO-9308070 A1 * 4/1993 ............. B62K 21/20

* cited by examiner

*Primary Examiner* — Drew J Brown
(74) *Attorney, Agent, or Firm* — Apex Juris, pllc; R. Lynette Wylie

(57) ABSTRACT

The present disclosure provides a shock-absorbing device for a fork of a bicycle, including a connection unit and a damping unit. The connection unit is adapted to connect to the fork of the bicycle and the damping unit. The fork is connected to a bottom end of the connection unit and is adapted to engage with a front wheel of the bicycle. The damping unit is adapted to engage with a handlebar stem and fit around the connection unit to prevent the connection unit from being in direct contact with the handlebar stem, thereby constituting the shock-absorbing device with good shock-absorbing effect.

10 Claims, 23 Drawing Sheets

SHOCK-ABSORBING DEVICE FOR FORK OF BICYCLE

BACKGROUND OF THE INVENTION

Technical Field

The present disclosure relates generally to a shock-absorbing device for a bicycle, and more particularly to a shock-absorbing device for a fork of a bicycle and adapted to absorb shock and isolate vibration.

Description of Related Art

Typically, a top end of a fork of a bicycle rotatably passes through a headtube of the bicycle and is connected to a handlebar stem (stem). The handlebar stem is connected to a handlebar of the bicycle. A bottom end of the fork is rotatable and is provided with a front wheel of the bicycle, so that when a rider rotates the handlebar, a direction of the front wheel could be changed and hence the rider could control a moving direction of the bicycle.

However, a connection between the fork and the handlebar stem of the bicycle is only fixed by using a fitting portion, which is a C-shaped opening, formed on an end of the handlebar stem and two bolts. No shock-absorbing structure or vibration-isolating structure is provided between the fork and the handlebar stem. As a result, when the bicycle travels on a rough road surface, an impact force between the front wheel and the road surface is directly transmitted to the handlebar stem and the handlebar through the fork, thereby causing uncomfortable feeling when the rider rides the bicycle and affecting the bicycle controllability. Accidents, such as falling, may be easily resulted. Accordingly, the conventional fork still has room for improvement.

BRIEF SUMMARY OF THE INVENTION

In view of the drawbacks of the conventional fork of the bicycle, the inventor develops the present disclosure to overcome the drawbacks of the conventional fork.

The primary objective of the present disclosure is to provide a shock-absorbing device for a fork of a bicycle, wherein a damping unit is provided between the fork and a handlebar stem to provide the effect of shock absorption and vibration isolation, so that an impact generated by a front wheel of the bicycle is prevented from being directly transmitted to the handlebar stem and a handlebar, thereby enhancing the comfortability and the safety of the bicycle.

The present disclosure provides a shock-absorbing device for a fork of a bicycle, including a damping unit and a connection unit. The damping unit includes a main body extending along an axial direction. The main body is engaged with a handlebar stem of the bicycle. The connection unit has a first engaging portion and a second engaging portion. The first engaging portion is adapted to engage with the fork of the bicycle, and the second engaging portion is adapted to engage with the damping unit.

In an embodiment, the first engaging portion encloses the fork; the first engaging portion has a fastening portion adapted to engage with a fastening member for fastening the first engaging portion to the fork.

In an embodiment, an inner diameter of the first engaging portion is greater than an inner diameter of the second engaging portion; an outer surface of the main body is provided with a flange extending radially outward; the flange at least partially covers the first engaging portion.

In an embodiment, the second engaging portion has a first through hole; the main body has a second through hole corresponding to the first through hole; after the main body is engaged with the second engaging portion, a pin passes through the first through hole and the second through hole to engage the damping unit with the connection unit.

In an embodiment, the pin has a screw hole; a top cover is disposed on a top end of the connection unit; a bolt of the top cover is screwed with the screw hole to fix the top cover to an end of the second engaging portion.

In an embodiment, the pin includes a fixing pin and an engaging member; an end of the fixing pin is engaged with the engaging member; the engaging member abuts against the main body.

In an embodiment, the pin includes a fixing pin and an engaging member; the fixing pin is engaged with the engaging member; the fixing pin has a first tool end; the engaging member has a second tool end; the first tool end and the second tool end are disposed on the handlebar stem.

In an embodiment, a material of the damping unit is different from a material of the connection unit.

In an embodiment, either the material of the damping unit or the material of the connection unit is non-metal.

In an embodiment, an elastic modulus of the damping unit is different from an elastic modulus of the connection unit; the elastic modulus of the damping unit is greater than the elastic modulus of the connection unit.

With the aforementioned design, the damping unit of the present disclosure provides the shock-absorbing and vibration-isolating effect between the fork and the handlebar stem, so that the vibration generated between the front wheel of the bicycle and the road surface is not directly transmitted to the handlebar stem and the handlebar, thereby enhancing the comfortability and the safety of the bicycle.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
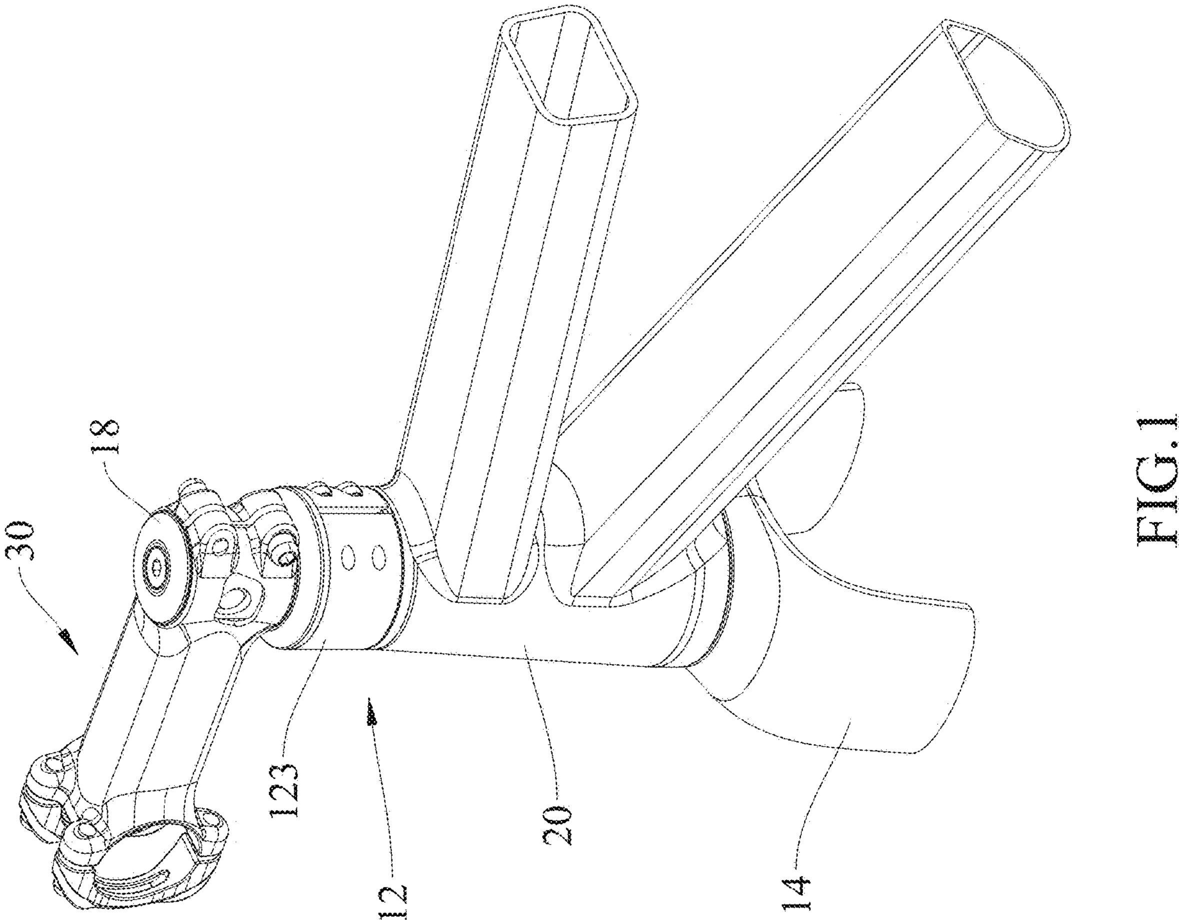
FIG. 1 is a perspective view of the shock-absorbing device mounted on the fork according to a first embodiment of the present disclosure.
Figure 2:
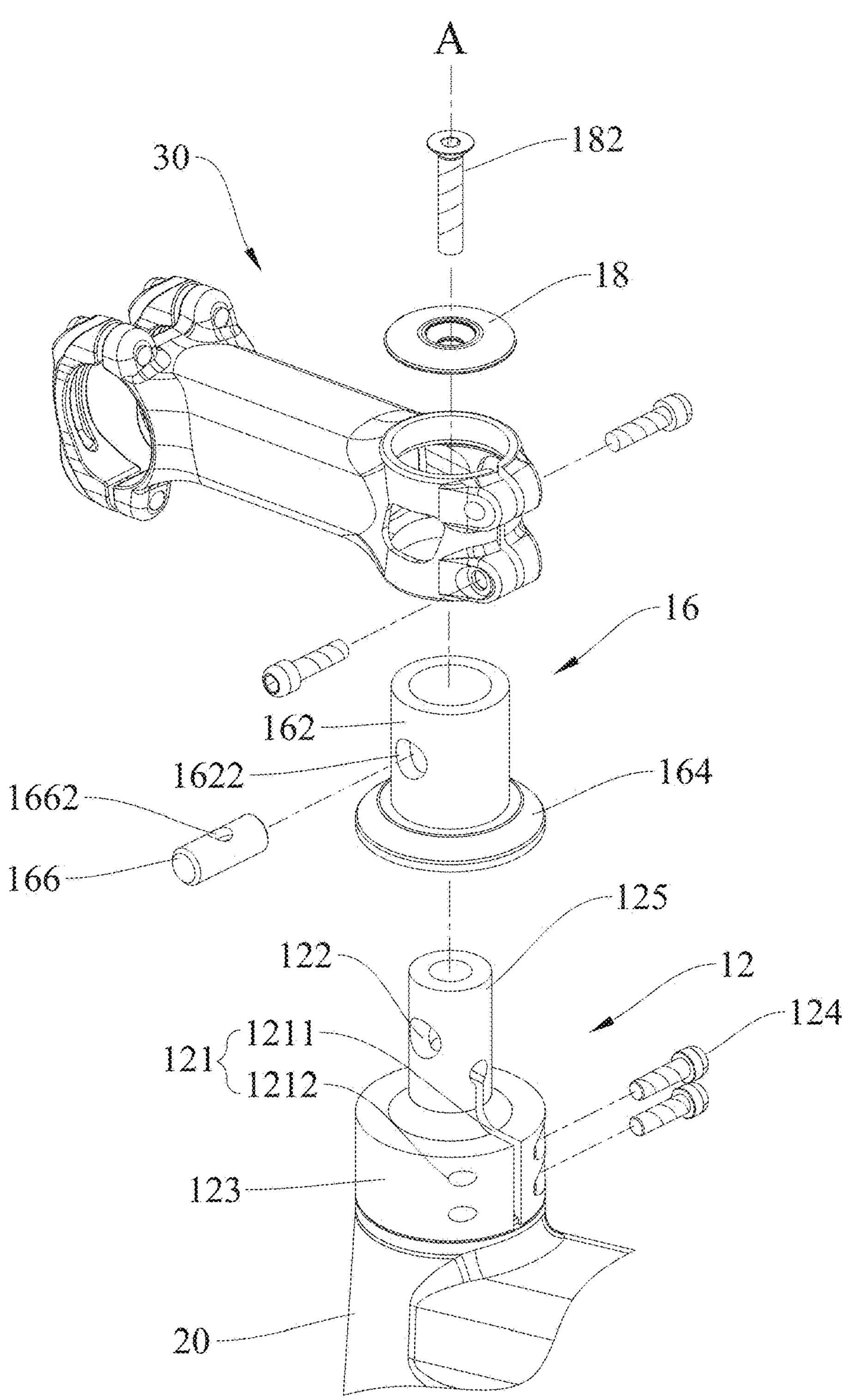
FIG. 2 is a partially exploded view of the shock-absorbing device mounted on the fork in FIG. 1.
Figure 3:
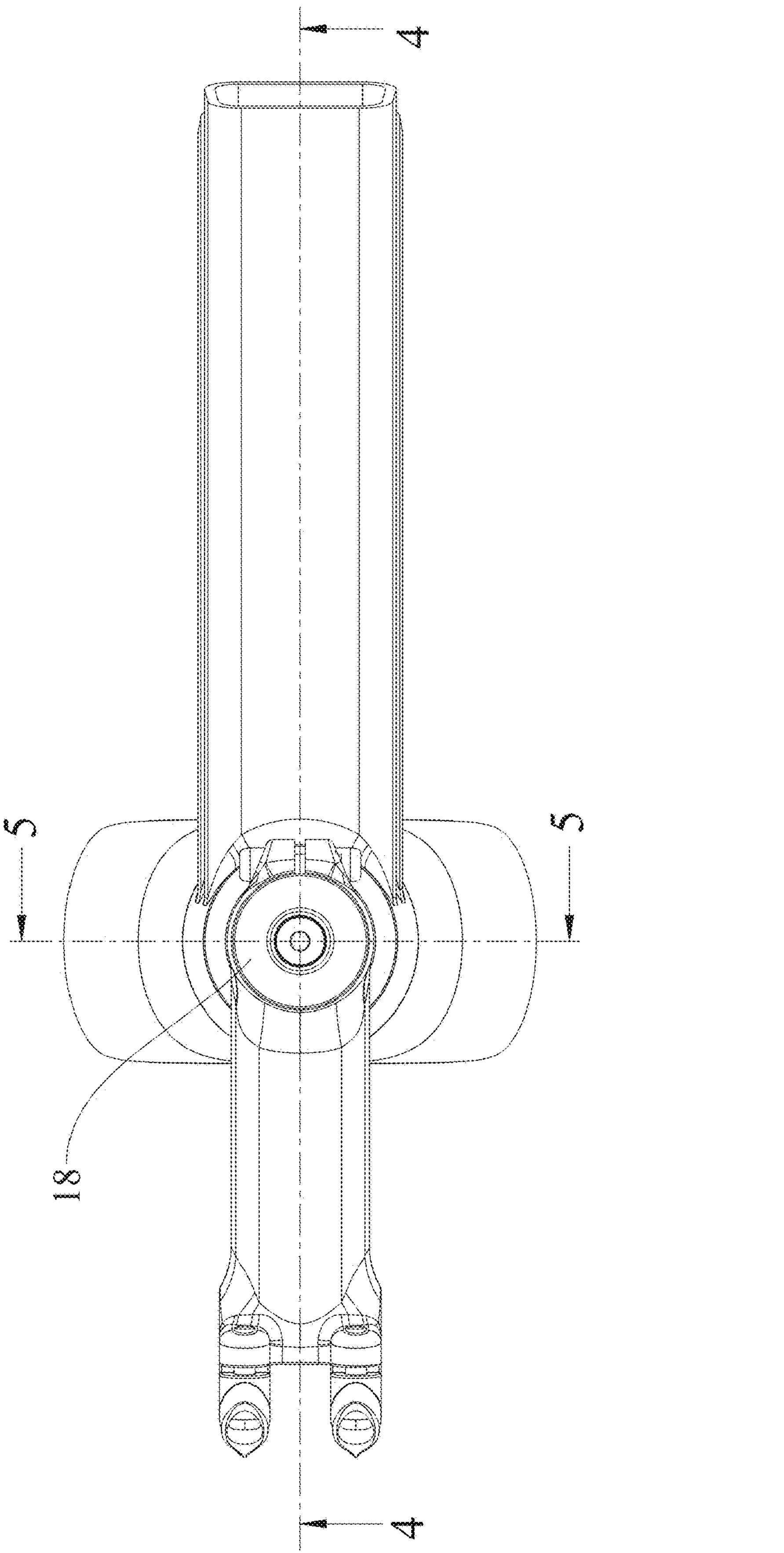
FIG. 3 is a top view of the shock-absorbing device mounted on the fork according to the first embodiment of the present disclosure.
Figure 4:
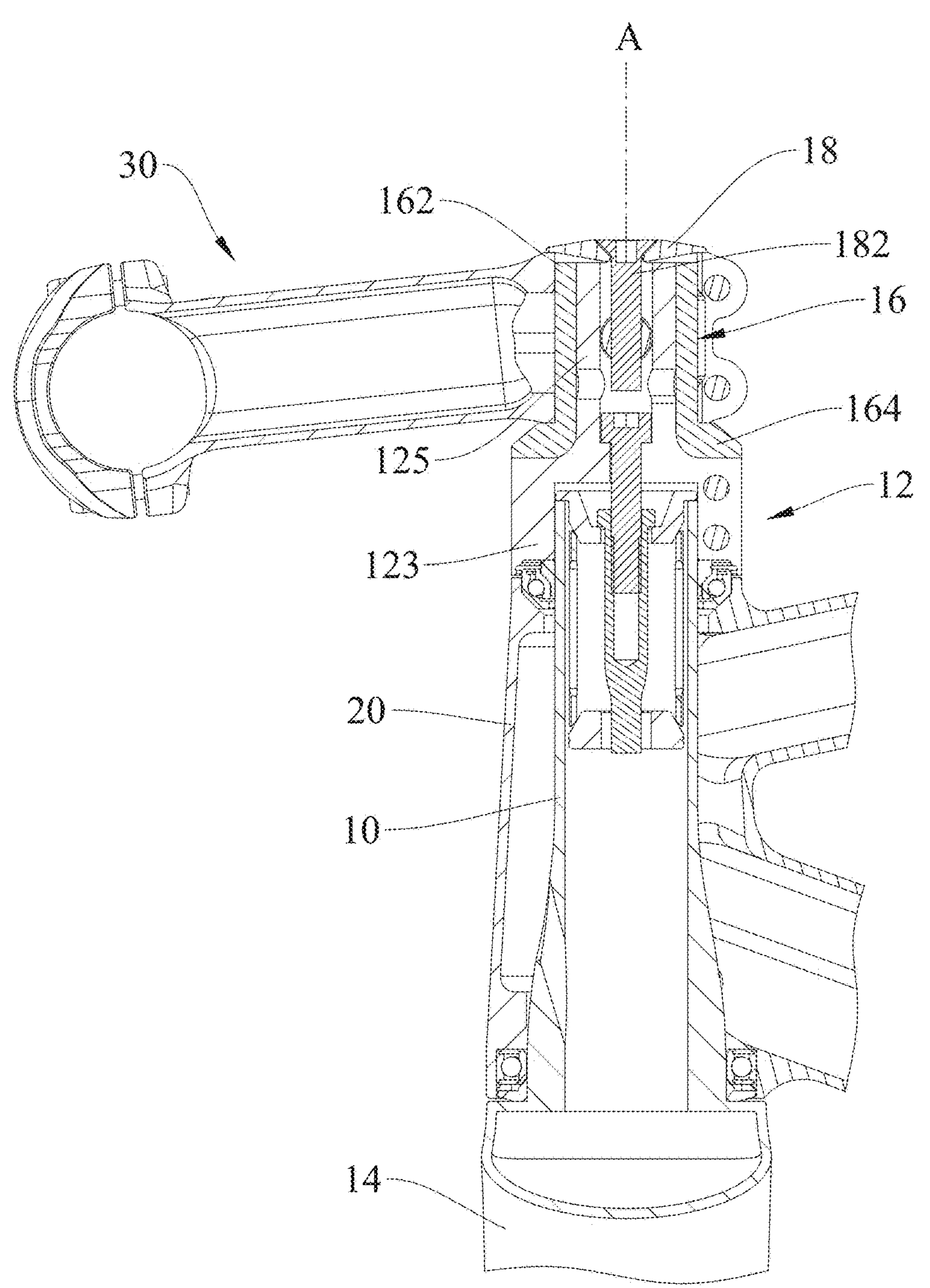
FIG. 4 is a sectional view along the 4-4 line in FIG. 3.
Figure 5:
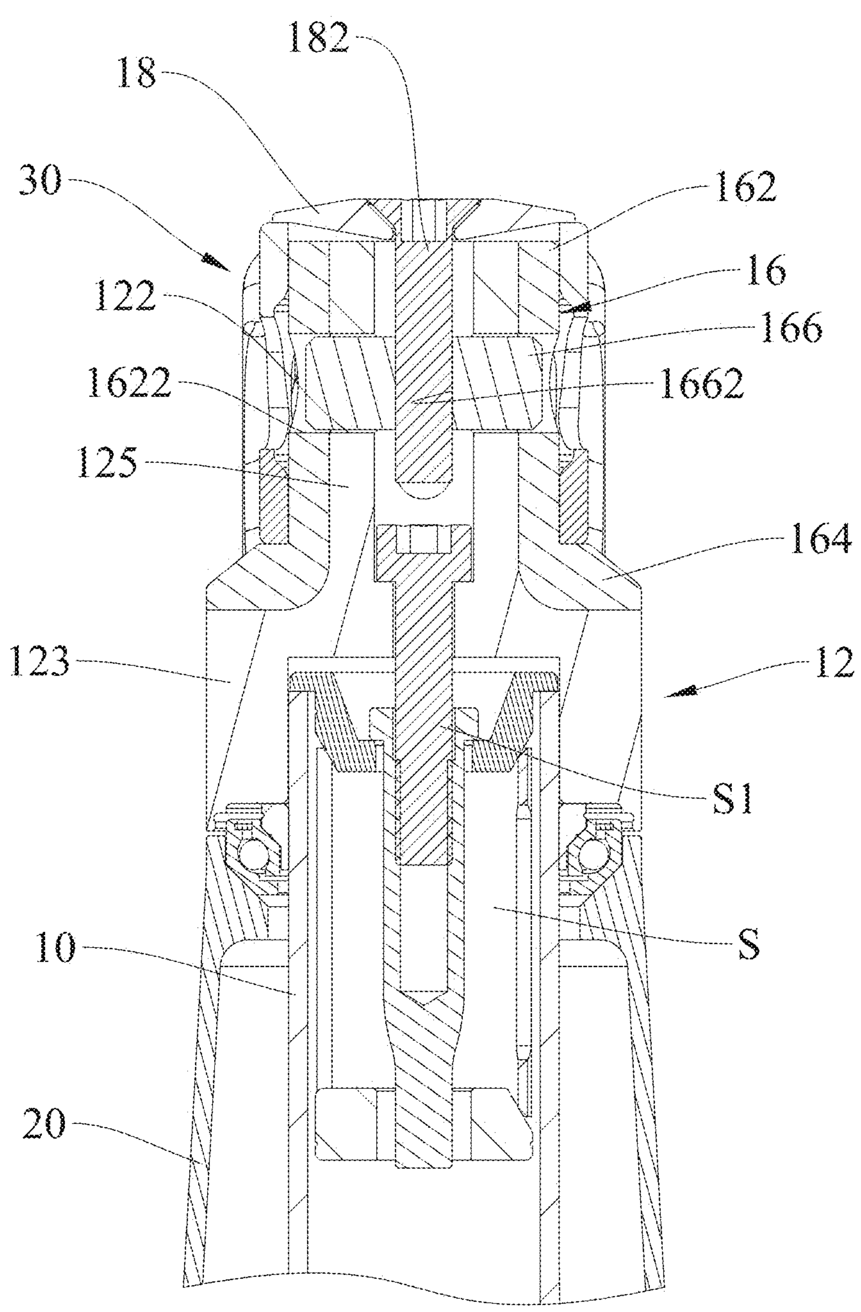
FIG. 5 is a sectional view along the 5-5 line in FIG. 3.

Referring to FIG. 1 to FIG. 5, a bicycle equipped with a shock-absorbing device for a fork of a bicycle mainly includes a steering device. The steering device substantially includes a headtube 20, a fork 10 and a handlebar stem 30. The fork 10 where the shock-absorbing device is mounted on is connected to a fork portion 14. The fork 10 rotatably penetrates through the headtube 20. A headset is typically disposed between the fork 10 and the headtube 20 to ensure that the fork 10 and the headtube 20 could smoothly rotate relative to each other. The fork portion 14 is rotatably engaged with a front wheel of the bicycle. In a first embodiment of the present disclosure, a part of the fork 10 extending out of the headtube 20 fits into a connection unit 12. An expander S fits in a top of the fork 10. An expansion bolt S1 passes through a center of the connection unit 12. The expansion bolt S1 is screwed with the expander S, so that the connection unit 12 is fixed to the top of the fork 10. The connection unit 12 is connected to a damping unit 16 to jointly form the shock-absorbing device.

The detailed structure of the shock-absorbing device is shown in FIG. 2 to FIG. 5. In the current embodiment, the damping unit 16 mainly includes a main body 162 and a pin 166. The main body 162 extends along an axial direction A. A bottom end of the main body 162 radially extends to form a flange 164 that is annular. The connection unit 12 is a tube body and has a first engaging portion 123 and a second engaging portion 125 that are connected to each other along the axial direction A. In the current embodiment, an outer diameter of the first engaging portion 123 is greater than an outer diameter of the second engaging portion 125, an inner diameter of the first engaging portion 123 is greater than an inner diameter of the second engaging portion 125, and the first engaging portion 123 is adapted to fit around the fork 10. A side of a periphery of the first engaging portion 123 has a fastening portion 121. The fastening portion 121 includes a slot 1211 and at least one fastening hole 1212. In the current embodiment, the at least one fastening hole 1212 includes two fastening holes 1212; each of the fastening holes 1212 penetrates through two sides of the slot 1211; one of two sides of each of the fastening holes 1212 being separated by the slot 1211 has a threaded section; two fastening members 124 are respectively engaged with the two fastening holes 1212, so that the first engaging portion 123 fits around and tightly clamp the fork 10.

When the main body 162 of the damping unit 16 fits around the connection unit 12, the main body 162 of the damping unit 16 encloses the second engaging portion 125 of the connection unit 12, and the flange 164 at least partially covers the first engaging portion 123 and abuts against the first engaging portion 123. The second engaging portion 125 has a first through hole 122 and the main body 162 of the damping unit 16 has a second through hole 1622, wherein the first through hole 122 and the second through hole 1622 face each other along a straight line. In this way, the pin 166 could pass through the second through hole 1622 of the damping unit 16 and the first through hole 122 of the second engaging portion 125 in sequence, so that the damping unit 16 could be steadily positioned at a predetermined position on the connection unit 12. Therefore, when the handlebar stem 30 in the current embodiment is connected to the fork 10 through the shock-absorbing device jointly formed by the connection unit 12 and the damping unit 16, a C-shaped opening on an end of the handlebar stem 30 fits around and tightly clamps the main body 162 of the damping unit 16 and the handlebar stem 30 is connected to the connection unit 12 through the damping unit 16 and then is connected to the fork 10 through the connection unit 12. Hence, the handlebar stem 30 is not in direct contact with the fork 10.

Moreover, after the fork 10, the shock-absorbing device, and the handlebar stem 30 are engaged, a top cover 18 is disposed on a top end of the connection unit 12 and is adapted to close an opening on the top end of the connection unit 12. The top cover 18 is an annular body and a bolt 182 is provided on a center of the top cover 18. The pin 166 of the damping unit 16 is provided with a screw hole 1662 for screwing with the bolt 182. The bolt 182 is screwed with the screw hole 1662 to fix the top cover 18 to an end of the main body 162, so that the pin 166 could not freely rotate nor be freely detached from the first through hole 122 of the connection unit 12 and the second through hole 1622 of the damping unit 16.

In the present disclosure, the connection unit 12 engaged with the fork 10 is connected to the damping unit 16, and the damping unit 16 and/or the connection unit 12 could provide the damping effect of reducing the vibration while transmitting the vibration. For example, an elastic modulus of the damping unit 16 and an elastic modulus of the connection unit 12 are set to be different, wherein the difference of the elastic moduli is caused by different materials of the damping unit 16 and the connection unit 12. In the current embodiment, a material of the damping unit 16 is non-metal, such as plastic, rubber, composite material, etc.; a material of the connection unit 12 is metal. In other embodiments, the material of the damping unit 16 could be metal and the material of the connection unit 12 could be non-metal, such as plastic, rubber, composite material, etc. In this way, when the bicycle travels on a rough road surface, the vibration generated between the front wheel and the road surface is not directly transmitted to the handlebar stem 30 and a handlebar due to the shock-absorbing and vibration-isolating effect of the damping unit 16 and/or the connection unit 12, so that the comfortability of riding the bicycle could be maintained and the handlebar could be prevented from shaking due to the vibration, thereby enhancing the controllability and the safety of the bicycle.

Figure 6:
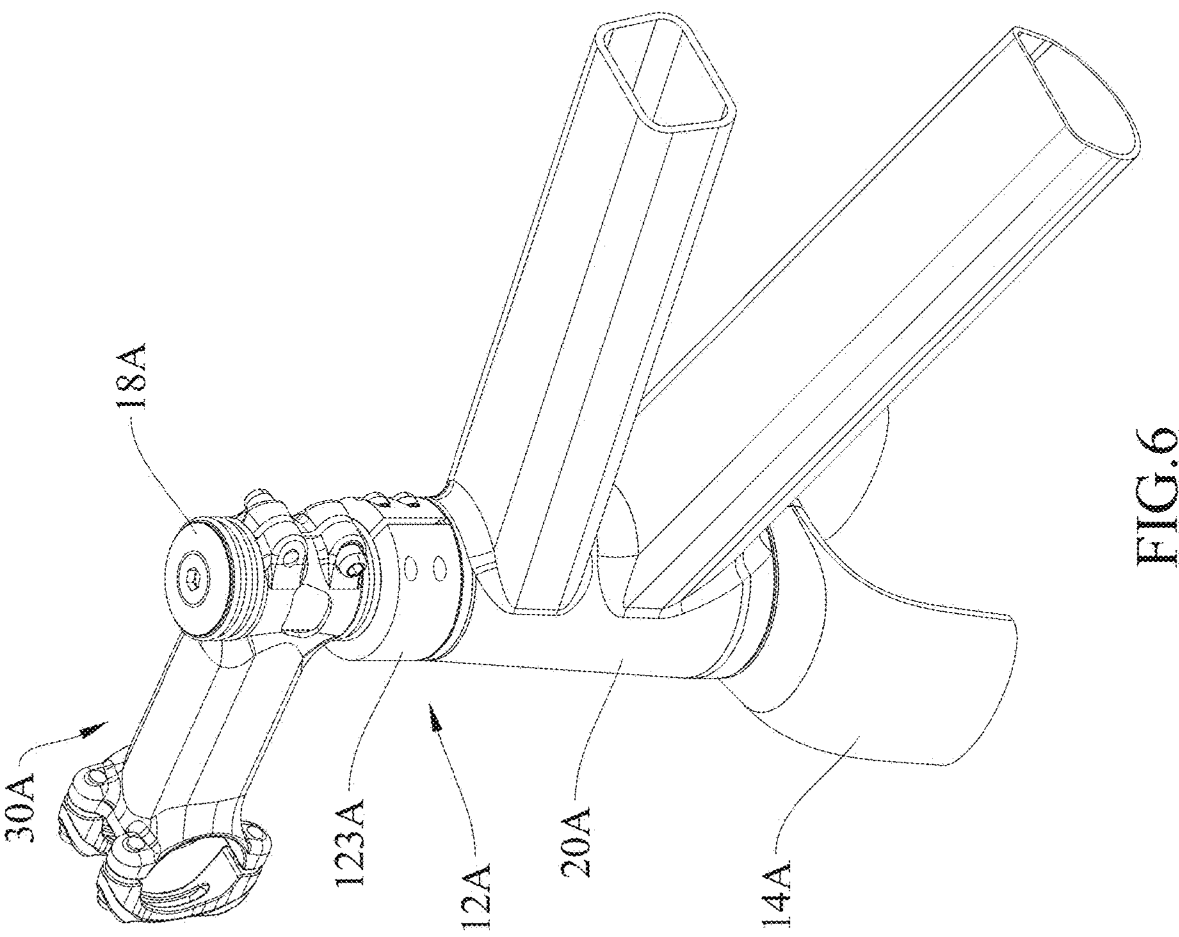
FIG. 6 is a perspective view of the shock-absorbing device mounted on the fork according to a second embodiment of the present disclosure.
Figure 7:
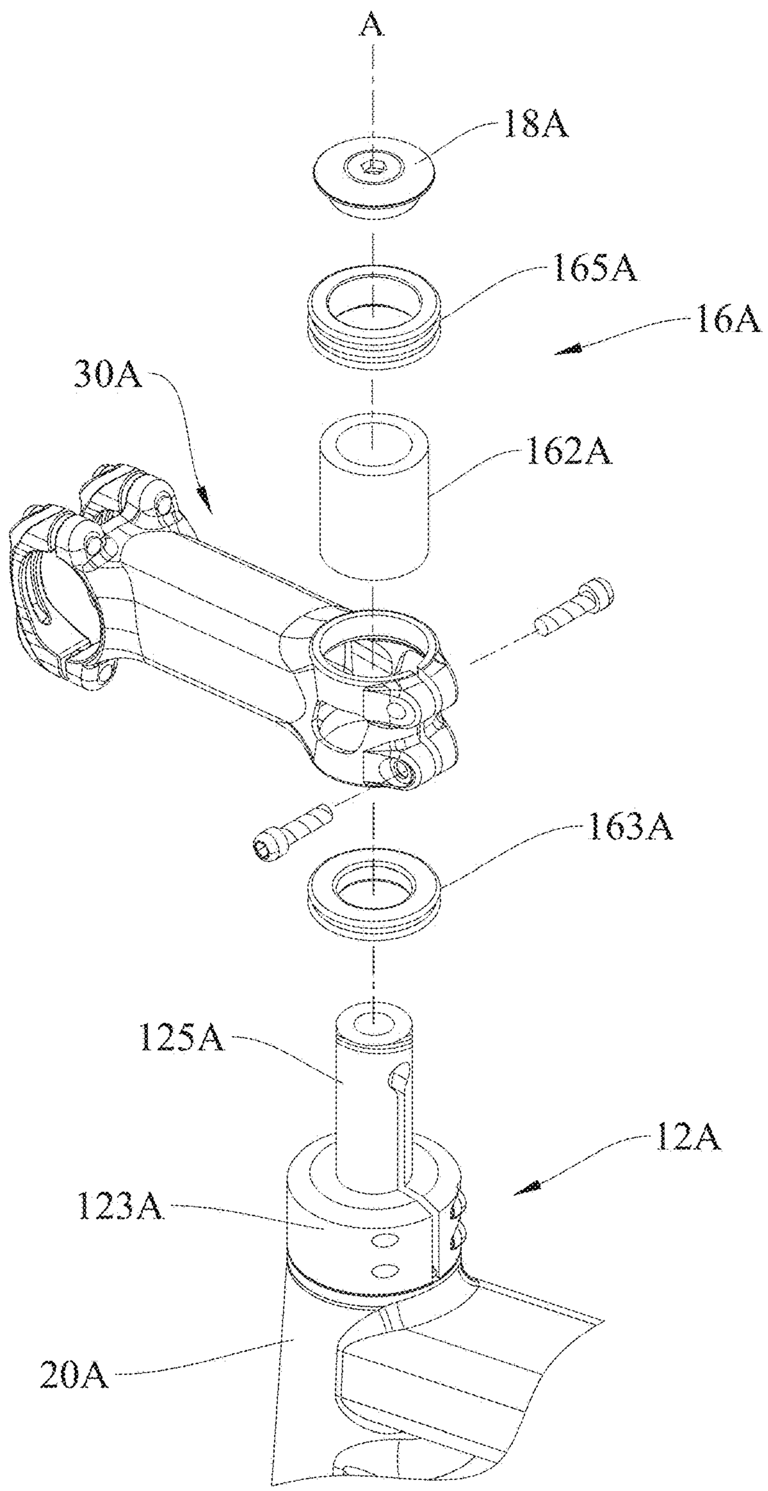
FIG. 7 is a partially exploded view of the shock-absorbing device mounted on the fork in FIG. 6.
Figure 8:
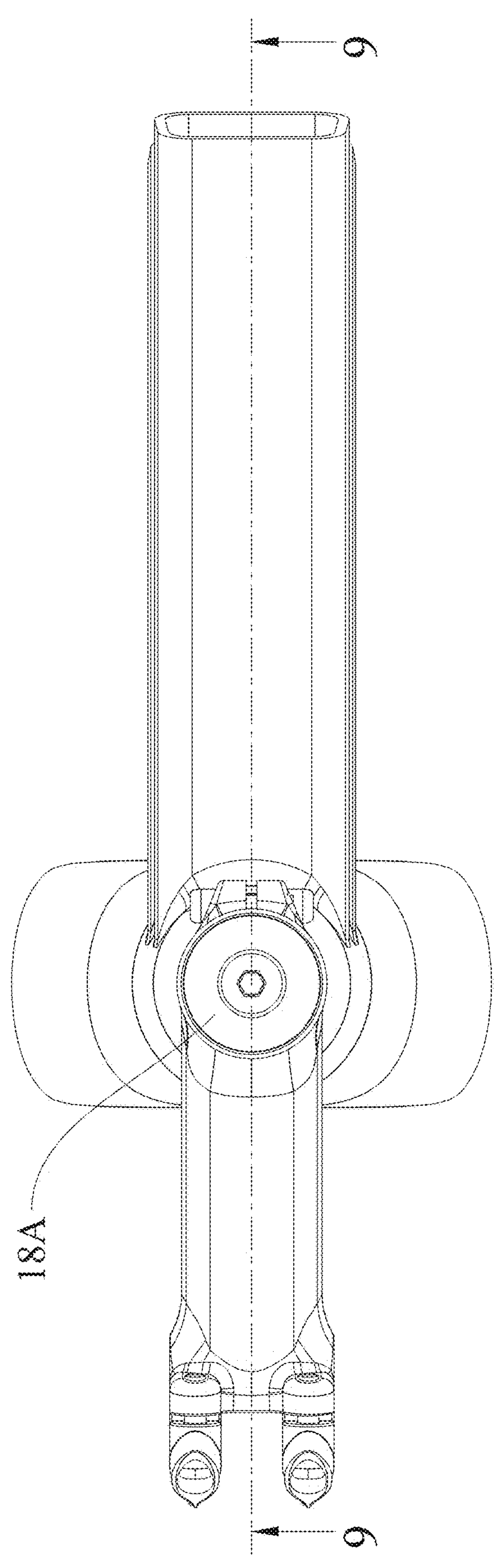
FIG. 8 is a top view of the shock-absorbing device mounted on the fork according to the second embodiment of the present disclosure.
Figure 9:
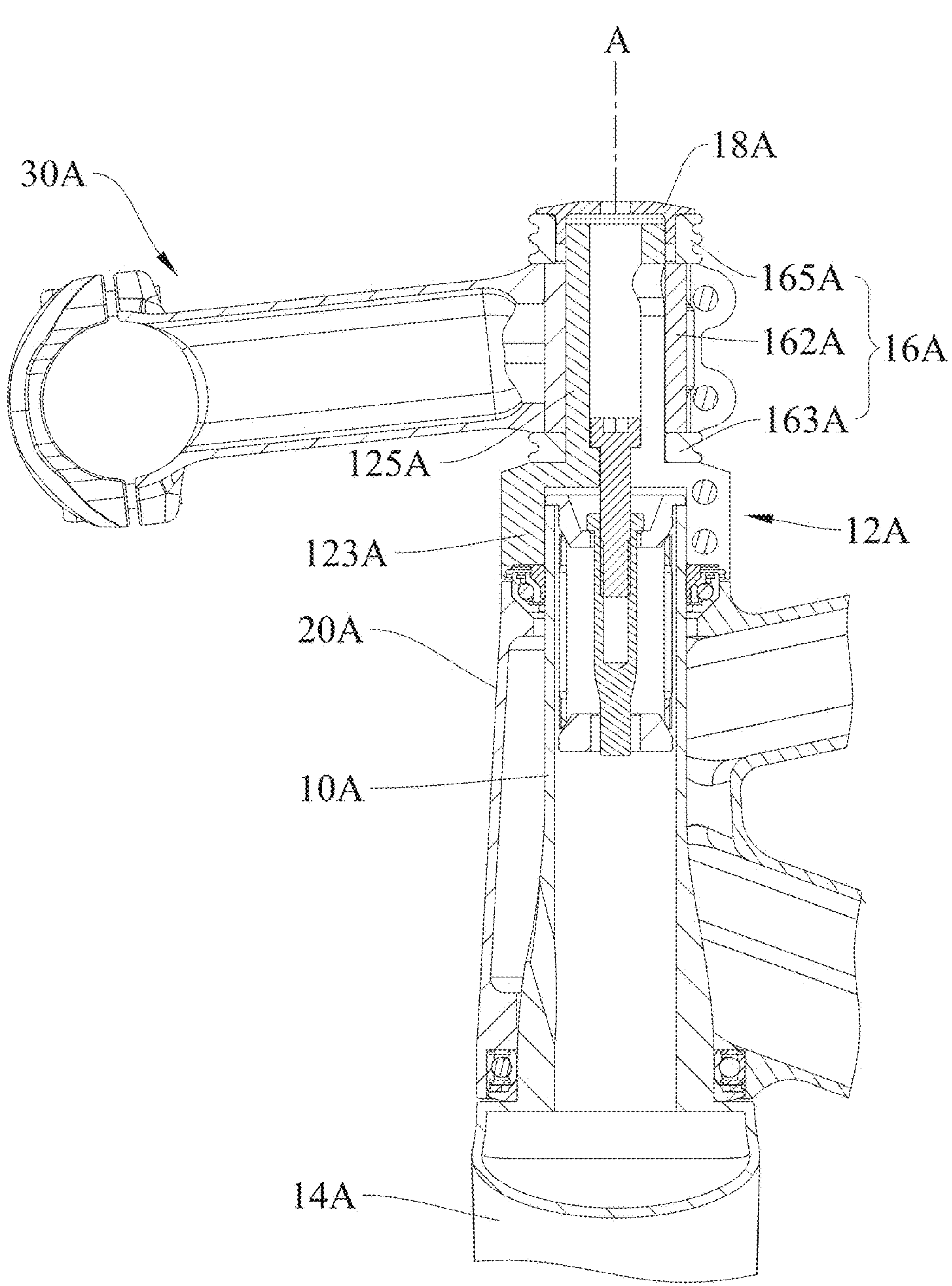
FIG. 9 is a sectional view along the 9-9 line in FIG. 8.

A second embodiment of the present disclosure is illustrated in FIG. 6 to FIG. 9. A bicycle equipped with a shock-absorbing device for a fork of a bicycle similarly includes a headtube 20A, a fork 10A, and a handlebar stem 30A. The fork 10A rotatably penetrates through the headtube 20A. A part of the fork 10A extending out of the headtube 20A fits into a connection unit 12A. The connection unit 12A is connected to a damping unit 16A to jointly form the shock-absorbing device.

The connection unit 12A is a tube body and has a first engaging portion 123A and a second engaging portion 125A that are connected to each other along an axial direction A. An outer diameter of the first engaging portion 123A is greater than an outer diameter of the second engaging portion 125A. The first engaging portion 123A tightly fits around a top of the fork 10A to be fixed. The damping unit 16A includes a main body 162A, a bottom ring 163A, and a top ring 165A. The main body 162A, the bottom ring 163A, and the top ring 165A fits around the connection unit 12A adapted to engage with the fork 10. More specifically, the top ring 165A, the main body 162A, and the bottom ring 163A fits around the second engaging portion 125A of the connection unit 12A from top down, the bottom ring 163A and a top end of the first engaging portion 123A of the connection unit 12A abut against each other, and the top ring 165A and a top cover 18A engaged with a top end of the connection unit 12A abut against each other. When a C-shaped opening of the handlebar stem 30A fits around the fork 10, the handlebar stem 30A fits around and tightly clamps the main body 162A of the damping unit 16A for fixing, and the bottom ring 163A and the top ring 165A are respectively located on a bottom end and a top end of the C-shaped opening of the handlebar stem 30A. In this way, by providing the damping unit 16A, the vibration generated by the front wheel could be prevented from being directly transmitted to the handlebar stem 30A and a handlebar, thereby enhancing the comfortability and the safety of the bicycle.

Figure 10:
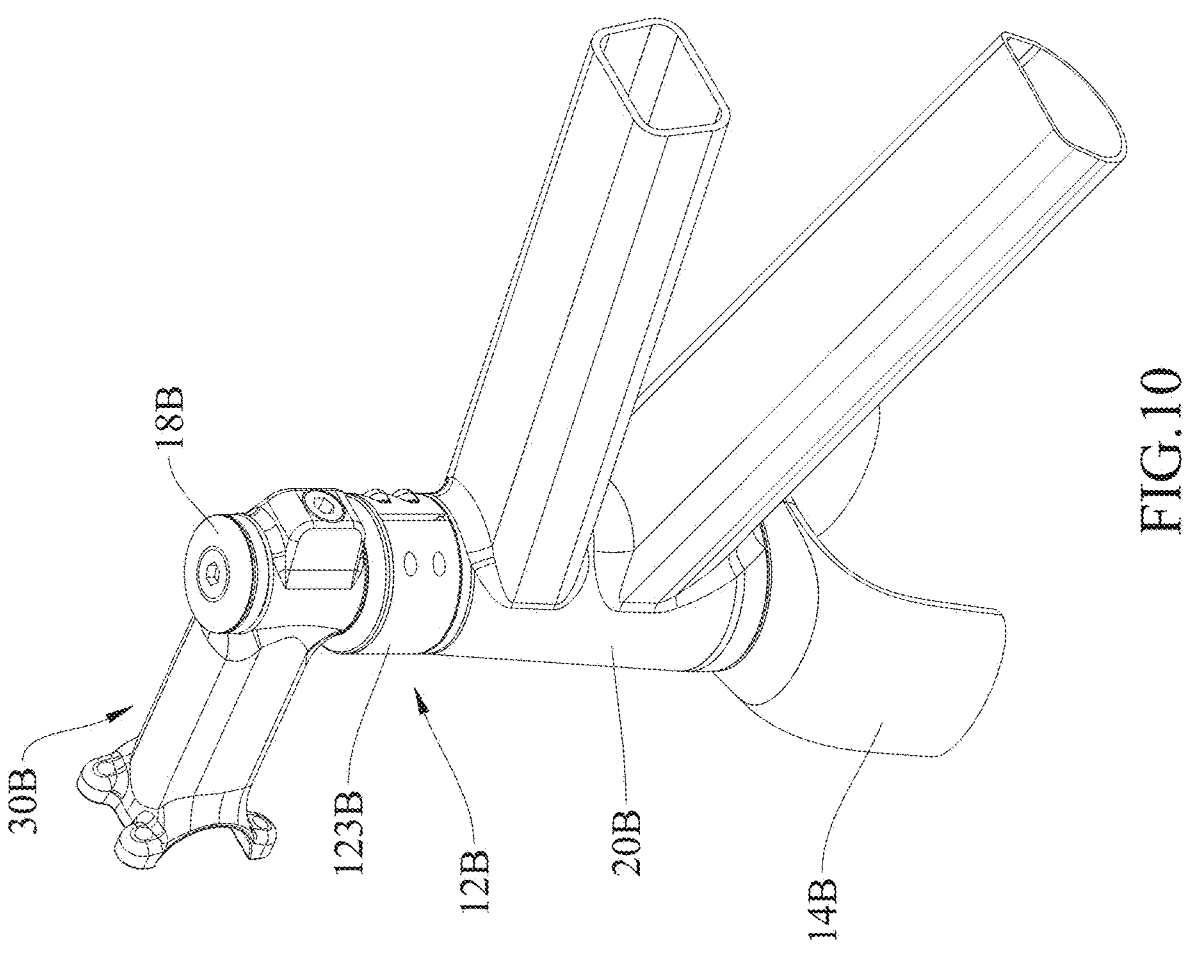
FIG. 10 is a perspective view of the shock-absorbing device mounted on the fork according to a third embodiment of the present disclosure.
Figure 11:
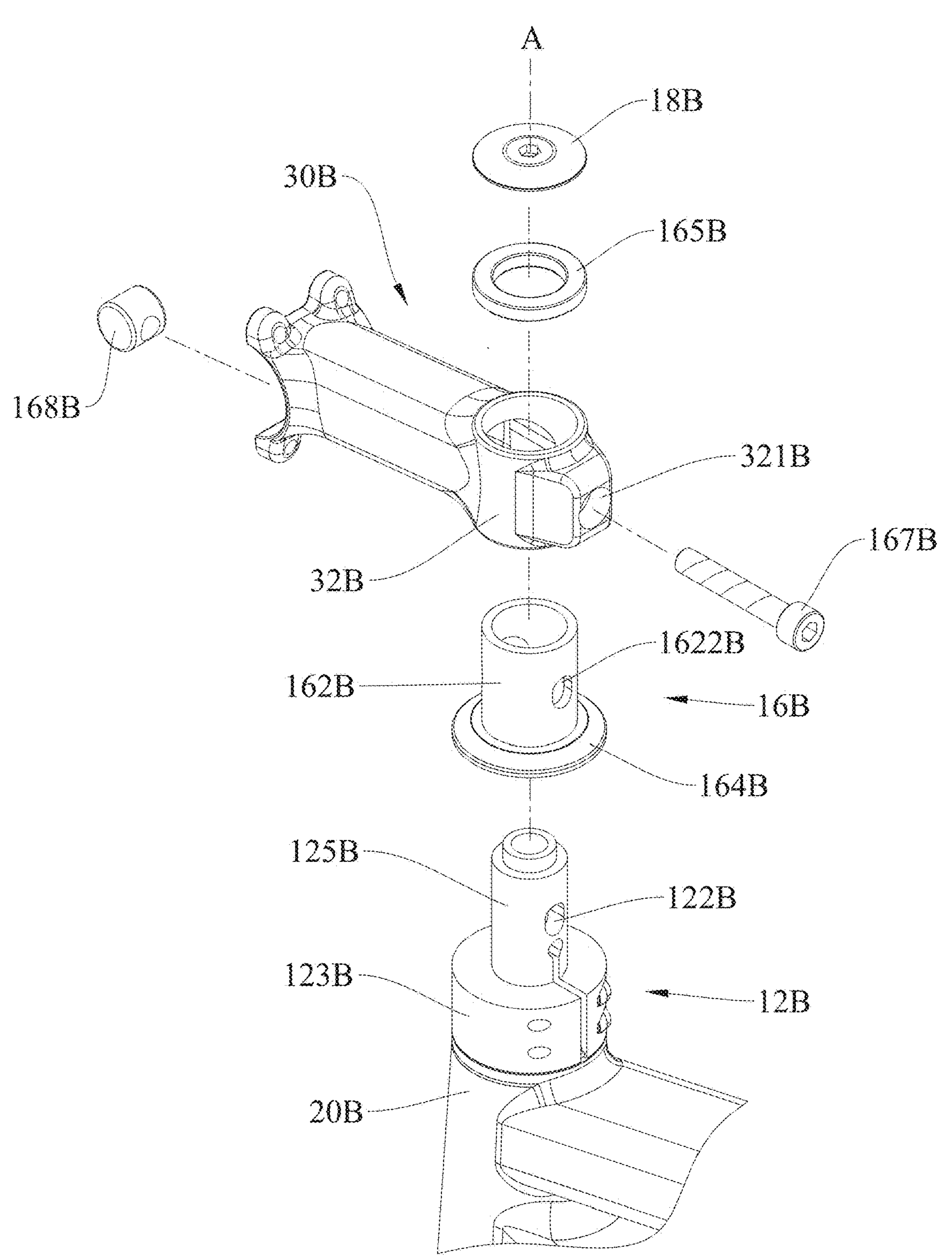
FIG. 11 is a partially exploded view of the shock-absorbing device mounted on the fork in FIG. 10.
Figure 12:
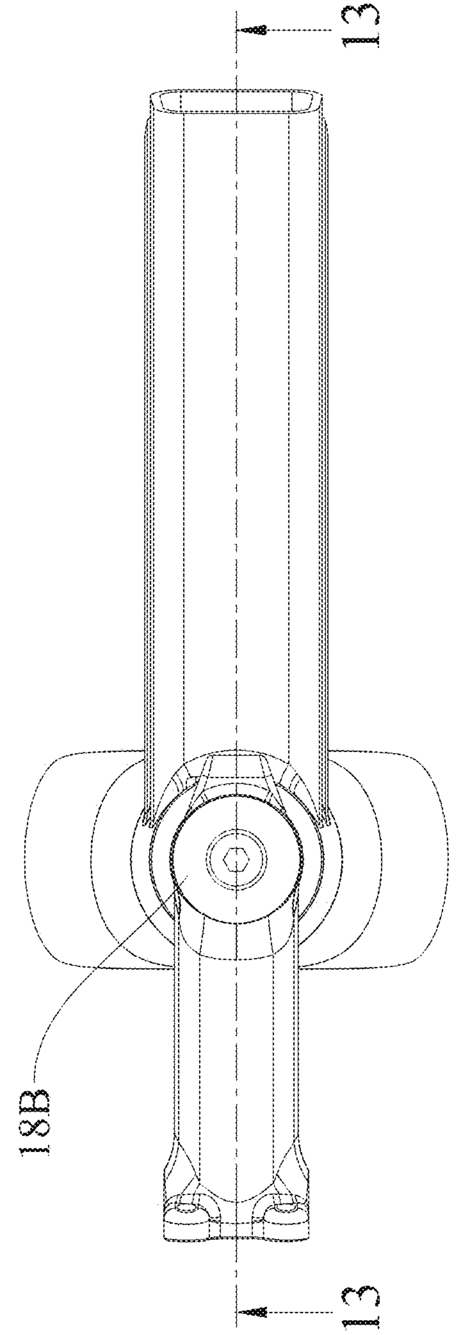
FIG. 12 is a top view of the shock-absorbing device mounted on the fork according to the third embodiment of the present disclosure.
Figure 13:
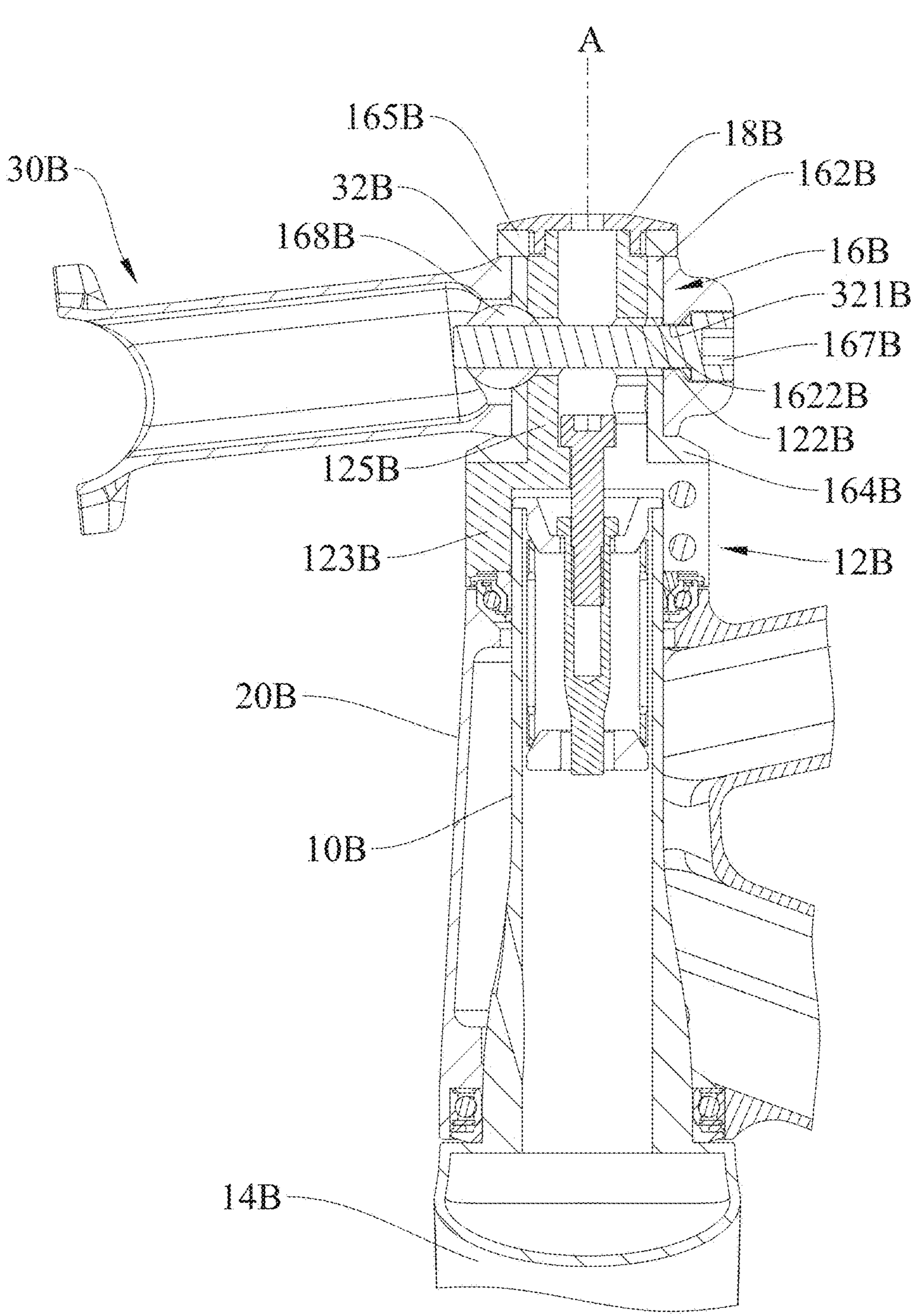
FIG. 13 is a sectional view along the 13-13 line in FIG. 12.

A third embodiment of the present disclosure is illustrated in FIG. 10 to FIG. 13. A bicycle equipped with a shock-absorbing device for a fork of a bicycle similarly includes headtube 20B, a fork 10B, and a handlebar stem 30B. The fork 10B rotatably penetrates through the headtube 20B. A part of the fork 10B extending out of the headtube 20B fits into a connection unit 12B. The connection unit 12B is connected to a damping unit 16B to jointly form the shock-absorbing device. The handlebar stem 30B is a tube body extending along a front-rear direction. A rear end of the handlebar stem 30B has a fitting portion 32B. The fitting portion 32B fits around the damping unit 16B of the shock-absorbing device. A positioning hole 321B penetrates through a rear side of the fitting portion 32B.

The connection unit 12B is a tube body and has a first engaging portion 123B and a second engaging portion 125B that are connected to each other along an axial direction A. In the current embodiment, an outer diameter of the first engaging portion 123B is greater than an outer diameter of the second engaging portion 125B, and the first engaging portion 123B fits around and tightly clamps a top of the fork 10B to be fixed. The damping unit 16B mainly includes a main body 162B, a fixing pin 167B, an engaging member 168B, and a top ring 165B. A bottom end of the main body 162B radially extends to form a flange 164B that is annular. When the damping unit 16B fits around the connection unit 12B of the top of the fork 10B, the main body 162B of the damping unit 16B encloses an outer side of the second engaging portion 125B of the connection unit 12B and the flange 164B abuts against a top end of the first engaging portion 123B. The second engaging portion 125B of the connection unit 12B has a first through hole 122B. The main body 162B of the damping unit 16B has a second through hole 1622B corresponding to the first through hole 122B. The positioning hole 321B of the handlebar stem 30B directly faces the second through hole 1622B. In this way, after the fixing pin 167B passes through the positioning hole 321B of the handlebar stem 30B, the fixing pin 167B penetrates through the second through hole 1622B of the damping unit 16B and the first through hole 122B of the connection unit 12B in sequence. An end of the fixing pin 167B is engaged with the engaging member 168B and the fixing pin 167B has the same function as the pin 166 in the first embodiment. At that time, the engaging member 168B is located in the handlebar stem 30B and abuts against the main body 162B, so that the damping unit 16B could be steadily positioned on the connection unit 12B. In this way, the fitting portion 32B on the rear end of the handlebar stem 30B could fit around the main body 162B of the damping unit 16B for fixing, so that the handlebar stem 30B could not rotate relative to the connection unit 12B or the damping unit 16B around the axial direction A.

In the current embodiment, the positioning hole 321B is a counterbore, the fixing pin 167B is a bolt with a head, and the engaging member 168B could be a nut or a tube body with a screw hole; therefore, when the head of the fixing pin 167B fits into the positioning hole 321B, the engaging member 168B could be screwed with an end of the fixing pin 167B. The top ring 165B is disposed on the connection unit 12B and abuts against a top edge of the main body 162B of the damping unit 16B. The top ring 165B and a top cover 18B engaged with a top end of the connection unit 12B abut against each other. When the rear end of the handlebar stem 30B fits around the connection unit 12B on the fork 10B, the fitting portion 32B on the rear end of the handlebar stem 30B fits around and tightly clamps the damping unit 16B of the shock-absorbing device for fixing and the fitting portion 32B is not in direct contact with the fork 10B. In this way, the vibration generated by the front wheel could be prevented from directly transmitted to the handlebar stem 30B and a handlebar, thereby enhancing the comfortability and the safety of the bicycle.

Figure 14:
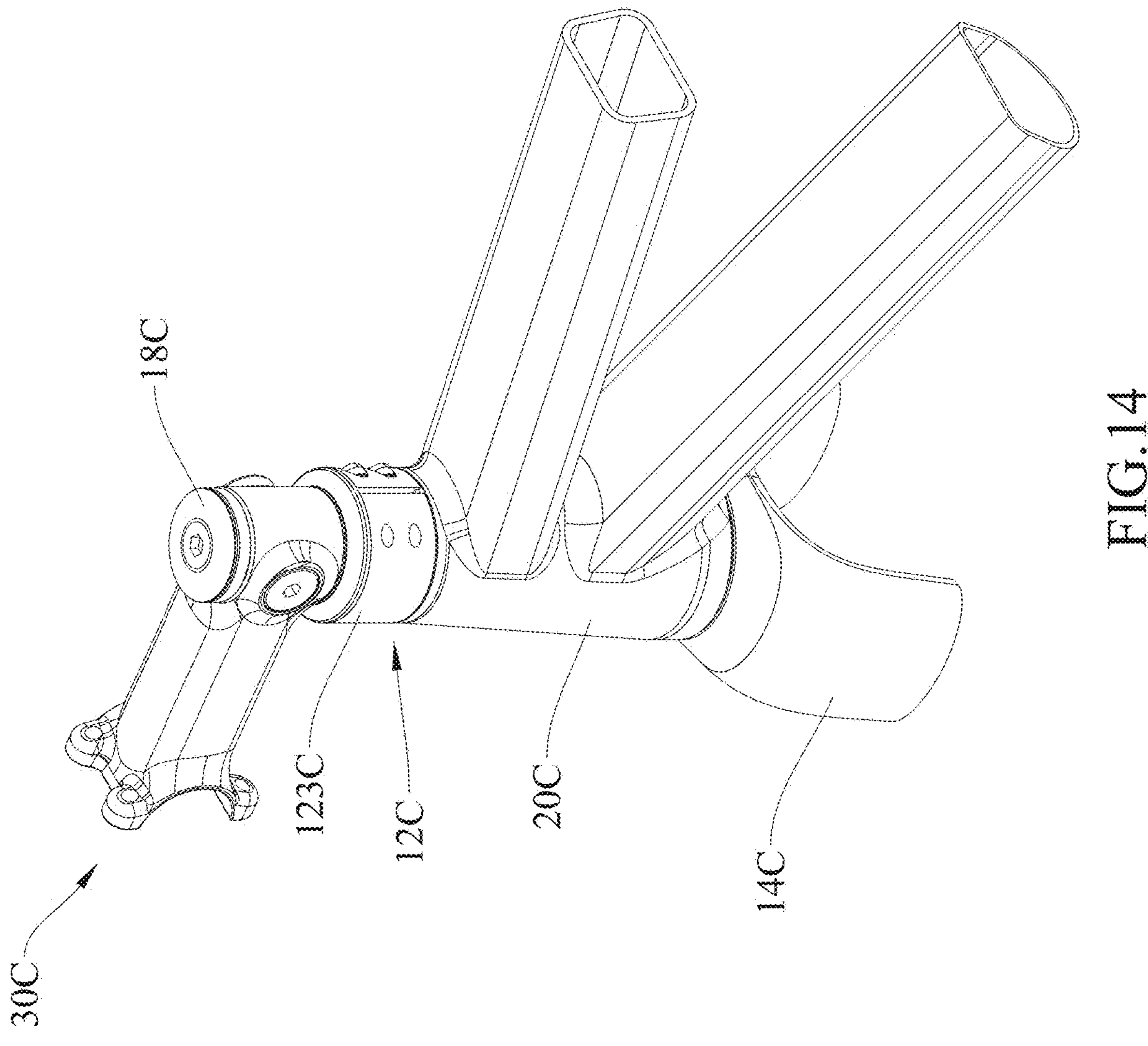
FIG. 14 is a perspective view of the shock-absorbing device mounted on the fork according to a fourth embodiment of the present disclosure
Figure 15:
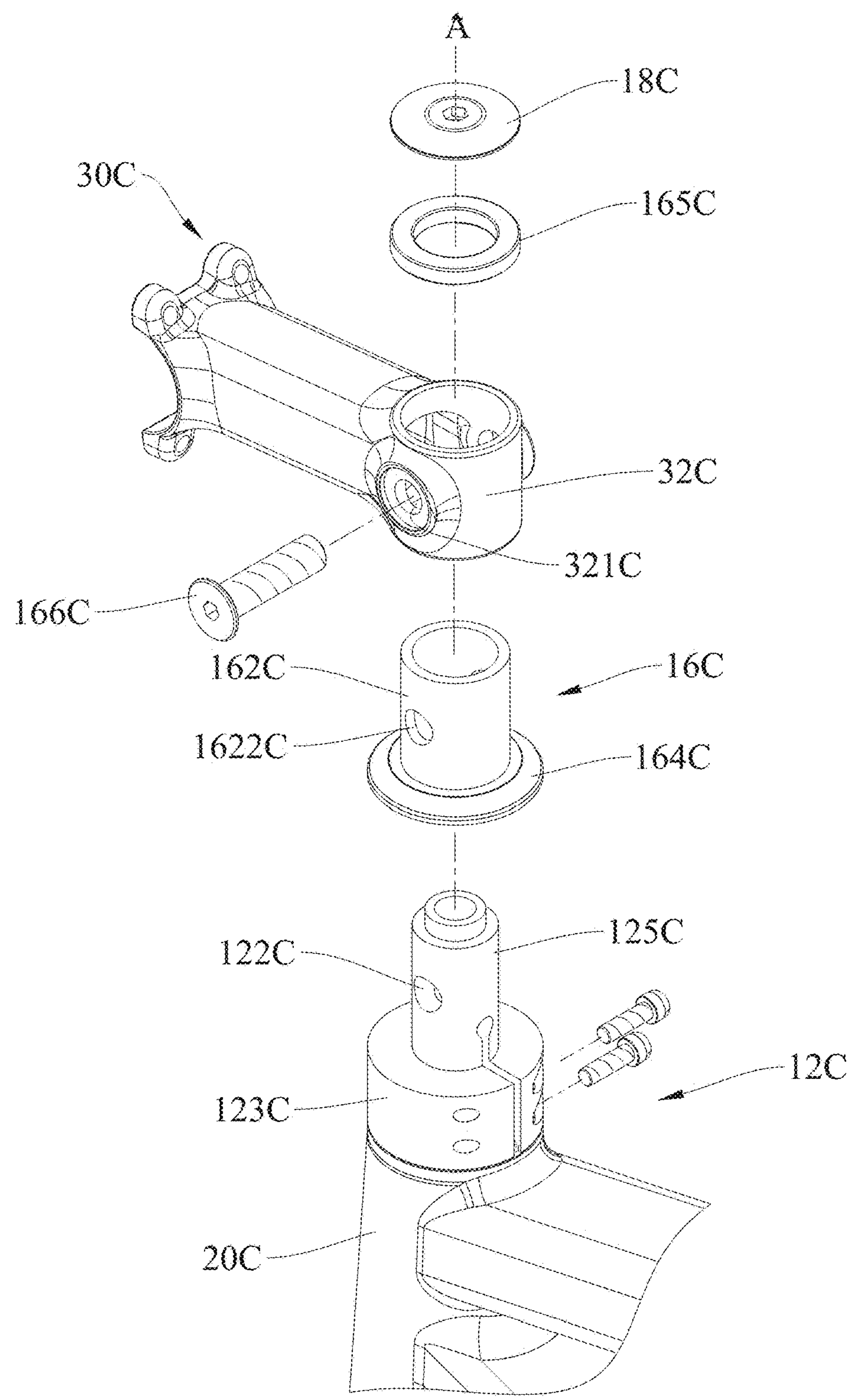
FIG. 15 is a partially exploded view of the shock-absorbing device mounted on the fork in FIG. 14.
Figure 16:
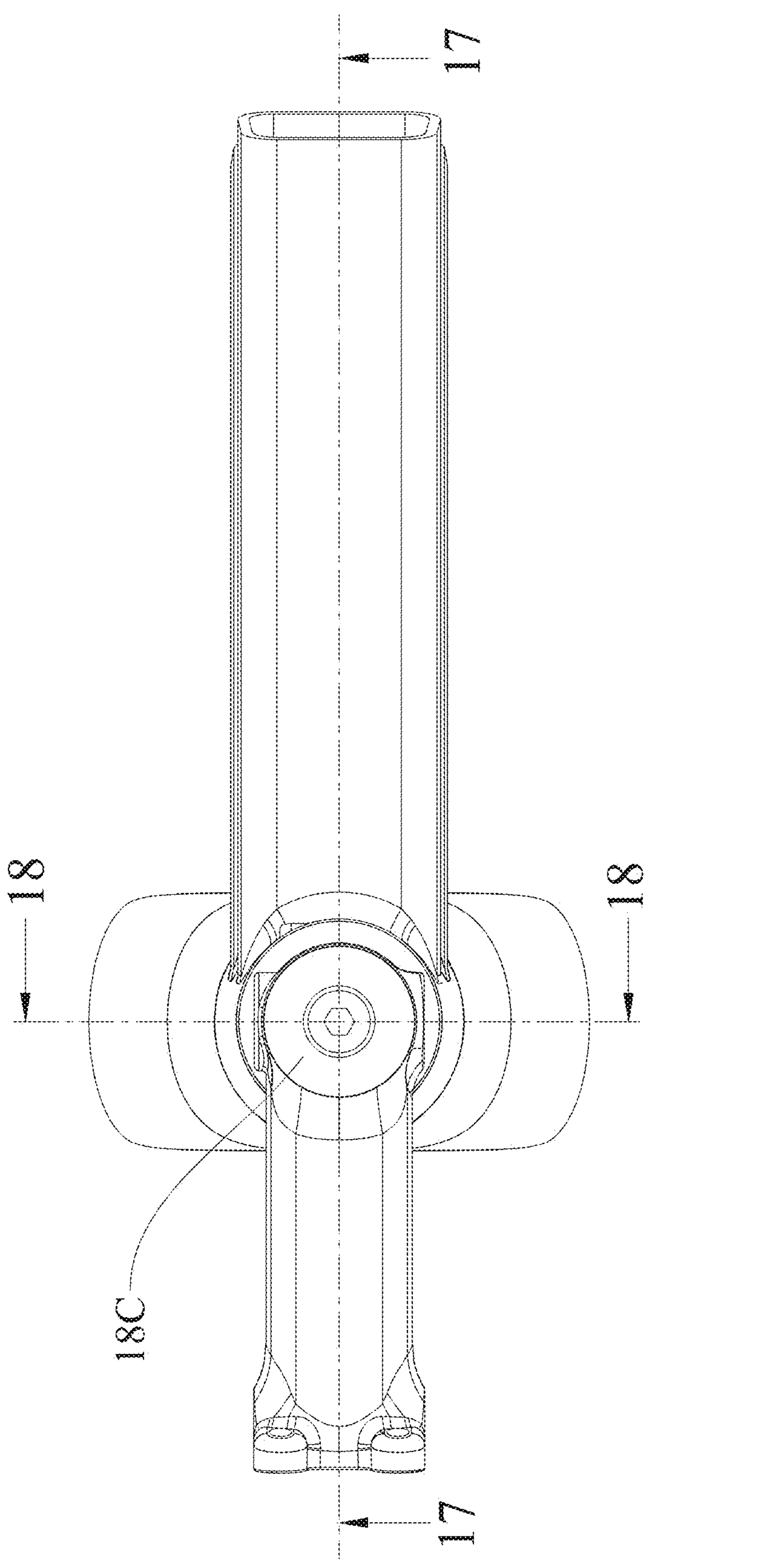
FIG. 16 is a top view of the shock-absorbing device mounted on the fork according to the fourth embodiment of the present disclosure.
Figure 17:
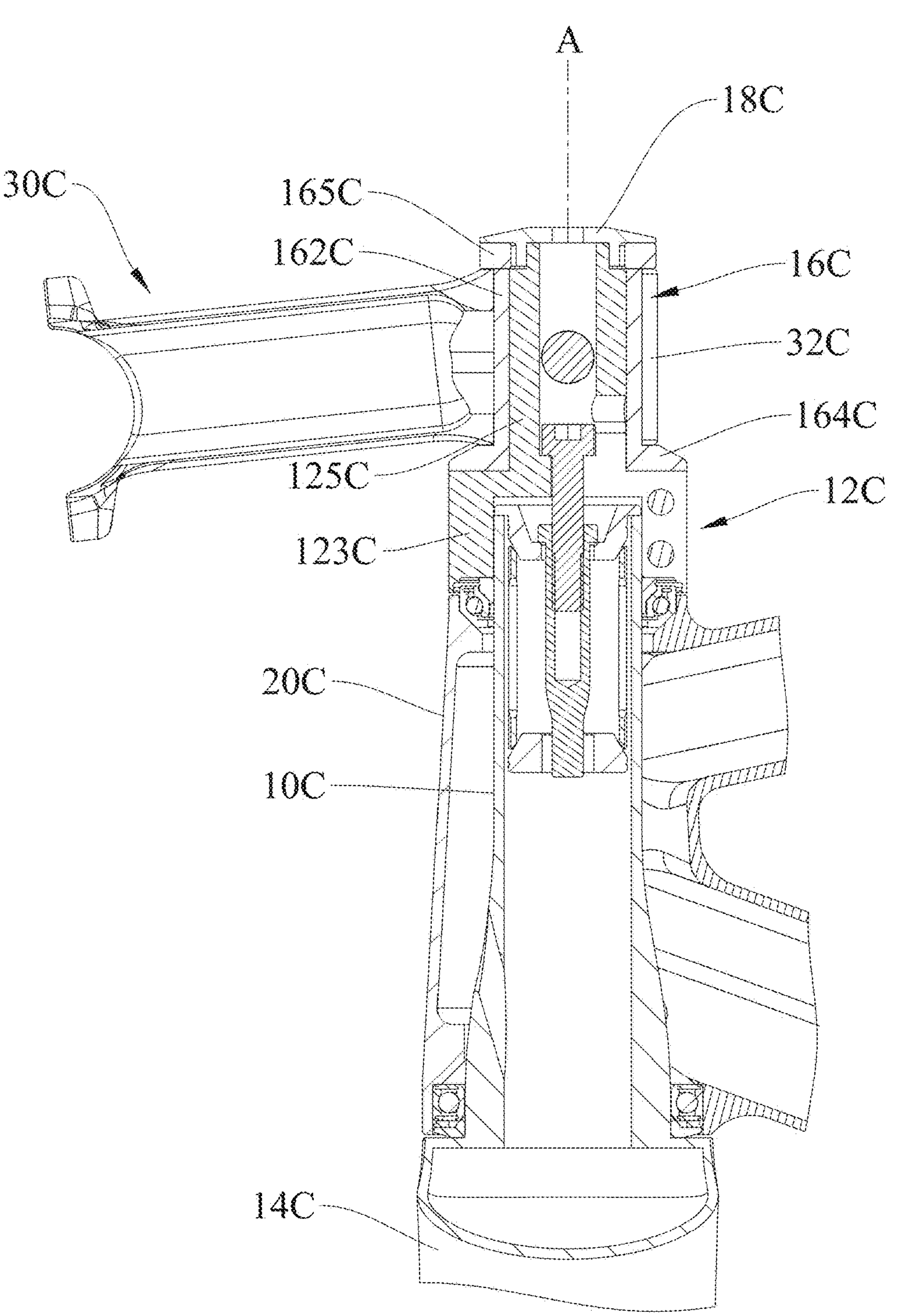
FIG. 17 is a sectional view along the 17-17 line in FIG. 16.
Figure 18:
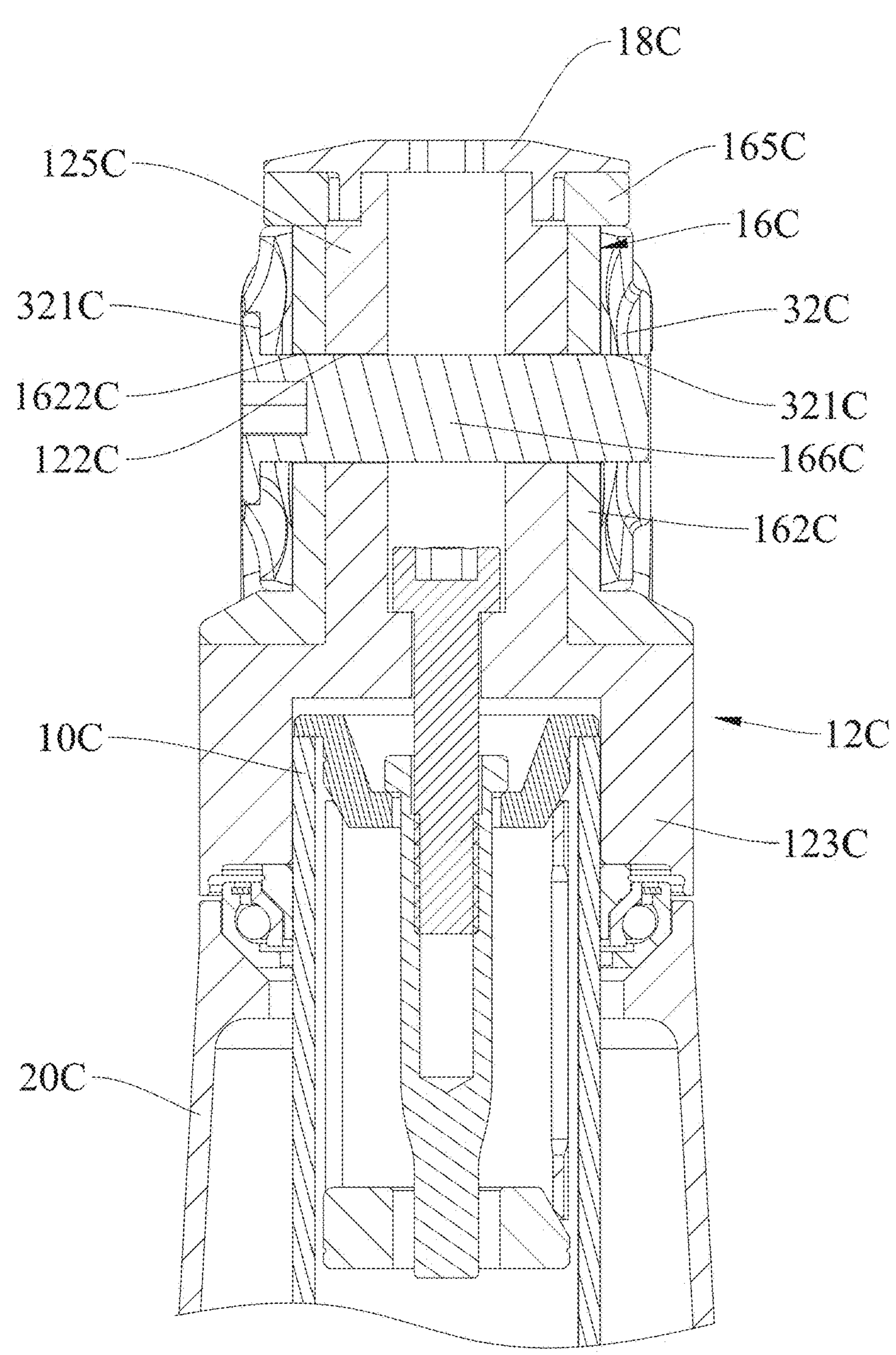
FIG. 18 is a sectional view along the 18-18 line in FIG. 16.

A fourth embodiment is illustrated in FIG. 14 to FIG. 18. A bicycle equipped with a shock-absorbing device for a fork of a bicycle similarly includes a headtube 20C, a fork 10C, and a handlebar stem 30C. The fork 10C rotatably penetrates through the headtube 20C. A part of the fork 10C extending out of the headtube 20C fits into a connection unit 12C. The connection unit 12C is connected to a damping unit 16C to jointly form the shock-absorbing device. The handlebar stem 30C is a tube body extending along a front-rear direction. A rear end of the handlebar stem 30C has a fitting portion 32C. The fitting portion 32C fits around the damping unit 16C of the shock-absorbing device. A positioning hole 321C penetrates through the fitting portion 32C along a left-right direction.

The connection unit 12C is a tube body and has first engaging portion 123C and a second engaging portion 125C that are connected to each other along an axial direction A. In the current embodiment, an outer diameter of the first engaging portion 123C is greater than an outer diameter of the second engaging portion 125C, and the first engaging portion 123C is adapted to fit around and tightly clamp a top of the fork 10C to be fixed. The damping unit 16C mainly includes a main body 162C, a pin 166C, and a top ring 165C. A bottom end of the main body 162C radially extends to form a flange 164C that is annular. When the damping unit 16C fits around the connection unit 12C, the main body 162C of the damping unit 16C encloses an outer side of the second engaging portion 125C of the connection unit 12C and the flange 164C abuts against a top end of the first engaging portion 123C of the connection unit 12C. The second engaging portion 125C of the connection unit 12C has a first through hole 122C and the main body 162C of the damping unit 16C has a second through hole 1622C, wherein the first through hole 122C and the second through hole 1622C face each other along a straight line. The positioning hole 321C of the handlebar stem 30C faces the second through hole 1622C and the first through hole 122C along the straight line. In this way, the pin 166C could pass through the positioning hole 321C of the handlebar stem 30C, the second through hole 1622C of the damping unit 16C, and the first through hole 122C of the connection unit 12C in sequence, so that the damping unit 16C could be steadily positioned on the connection unit 12C and the fitting portion 32C on the rear end of the handlebar stem 30C could fit around the main body 162C of the damping unit 16C for fixing. Therefore, the handlebar stem 30C could not rotate relative to the connection unit 12C or the damping unit 16C around the axial direction A.

In the current embodiment, a side of the positioning hole 321C is a counterbore, and another side of the positioning hole 321C is a screw hole. The pin 166C is a bolt and passes through the side of the positioning hole 321C, the second through hole 1622C, and the first through hole 122C in sequence to be screwed with the another side of the positioning hole 321C for fixing, so that the pin 166C is fixed on the handlebar stem 30C and passes through the second through hole 1622C and the first through hole 122C. The top ring 165C fits around the connection unit 12C and abuts against a top end of the main body 162C of the damping unit 16C. The top ring 165 C and a top cover 18C engaged with a top end of the connection unit 12C abut against each other. When the handlebar stem 30C is mounted on the shock-absorbing device, the fitting portion 32C on the rear end of the handlebar stem 30C fits around and tightly clamps the damping unit 16C and is not in direct contact with the connection unit 12C mounted on the fork 10C, so that the direct transmission of the vibration could be reduced, thereby enhancing the comfortability and the safety of the bicycle.

In the aforementioned embodiments, the damping unit 16, 16A, 16B, 16C could be a spring or an elastic piece that could provide the shock-absorbing effect. All structures which could prevent the direct contact between the fork 10, 10A, 10B, 10C and the handlebar stem 30, 30A, 30B, 30C and could isolate the vibration generated by the front wheel and transmitted from the fork 10, 10A, 10B, 10C to the handlebar stem 30, 30A, 30B, 30C should fall within the scope of the damping unit 16, 16A, 16B, 16C of the present disclosure.

Figure 19:
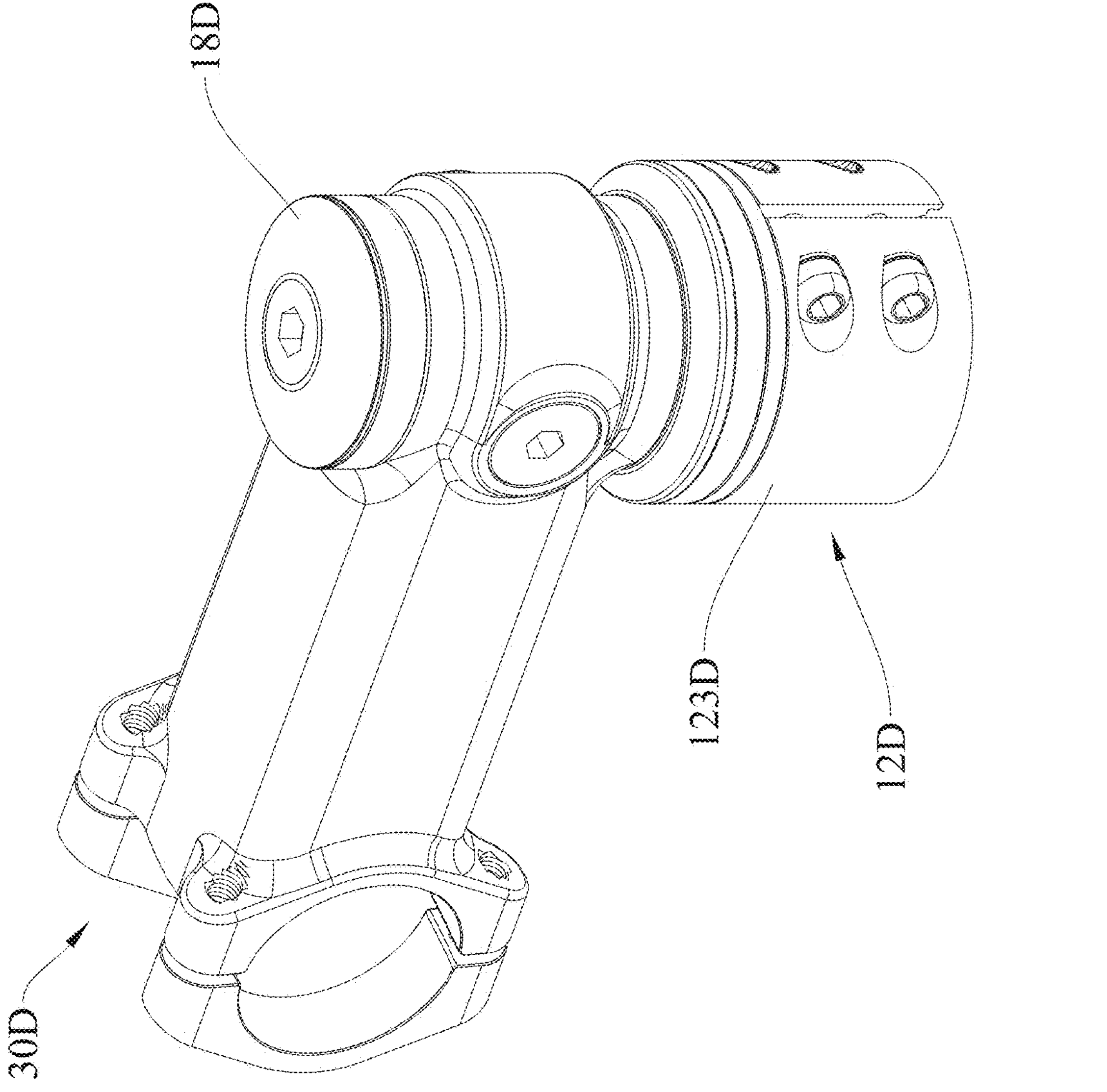
FIG. 19 is a perspective view of the shock-absorbing device mounted on the fork according to a fifth embodiment of the present disclosure.
Figure 20:
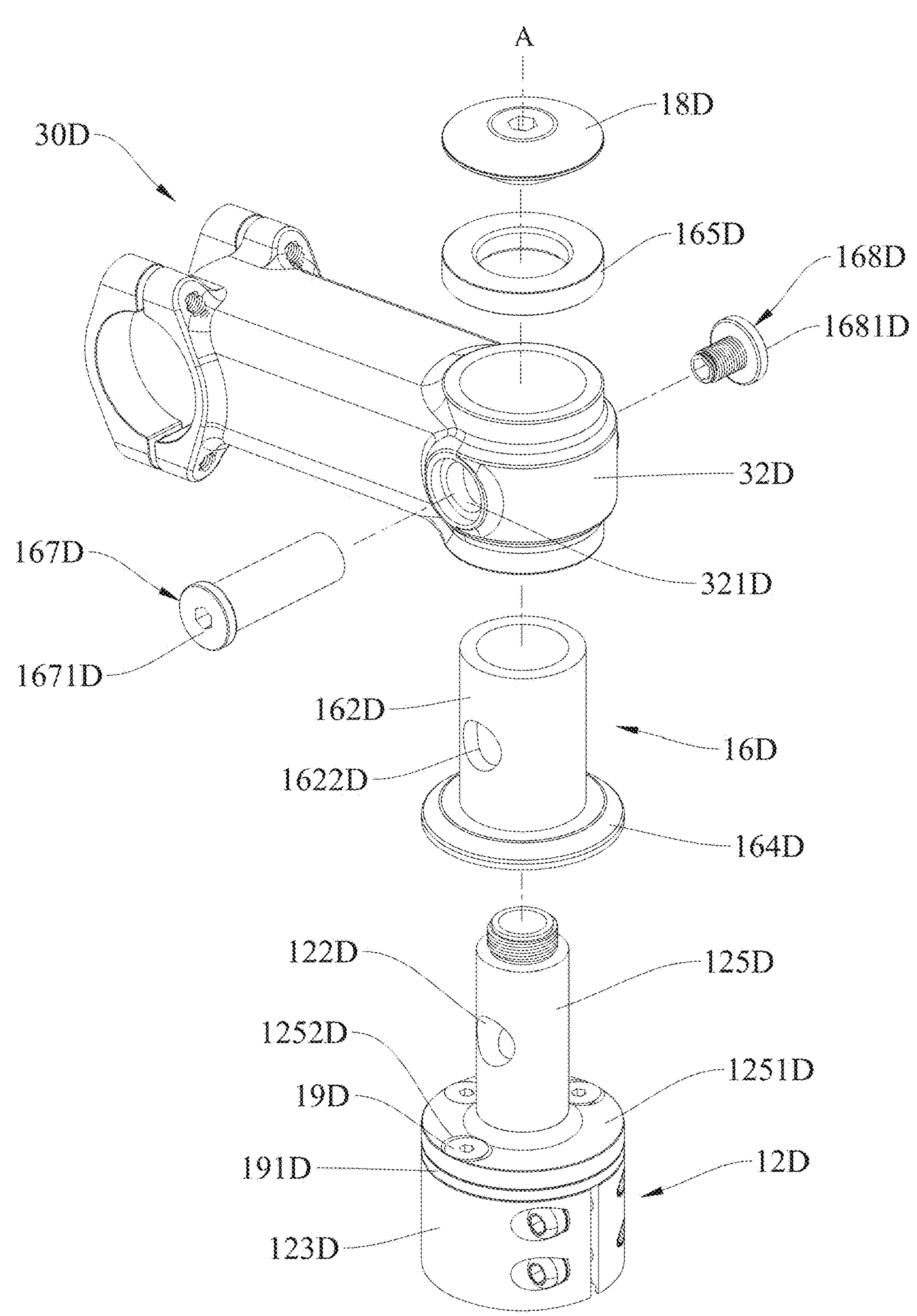
FIG. 20 is a partially exploded view of the shock-absorbing device mounted on the fork in FIG. 19.
Figure 21:
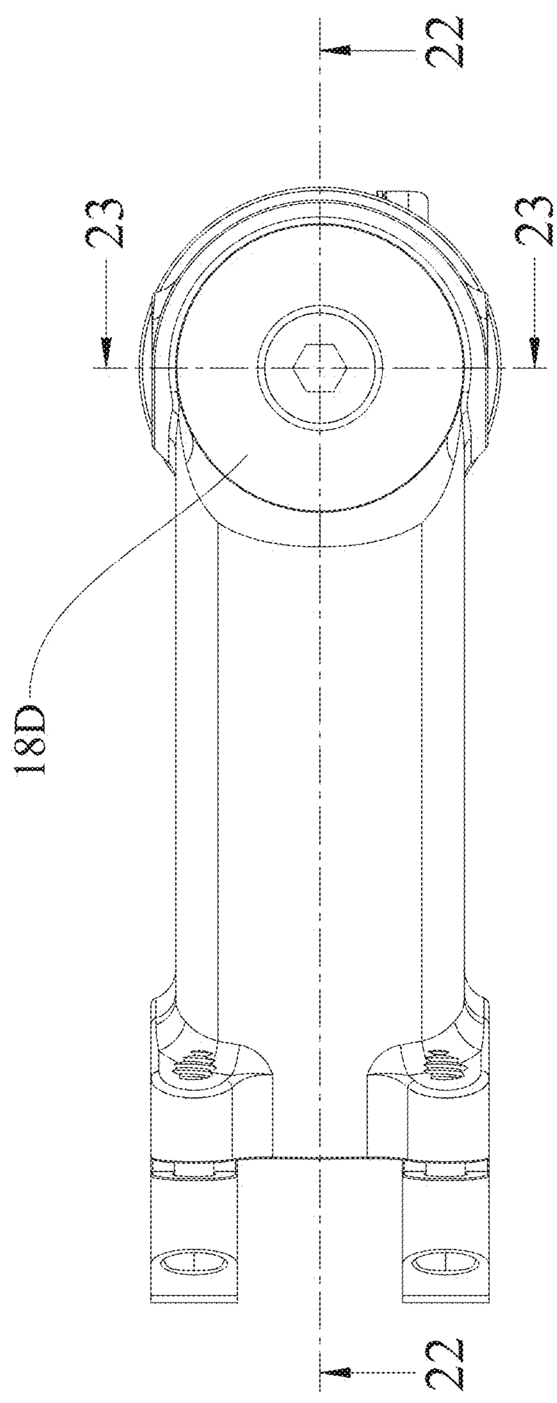
FIG. 21 is a top view of the shock-absorbing device mounted on the fork according to the fifth embodiment of the present disclosure.
Figure 22:
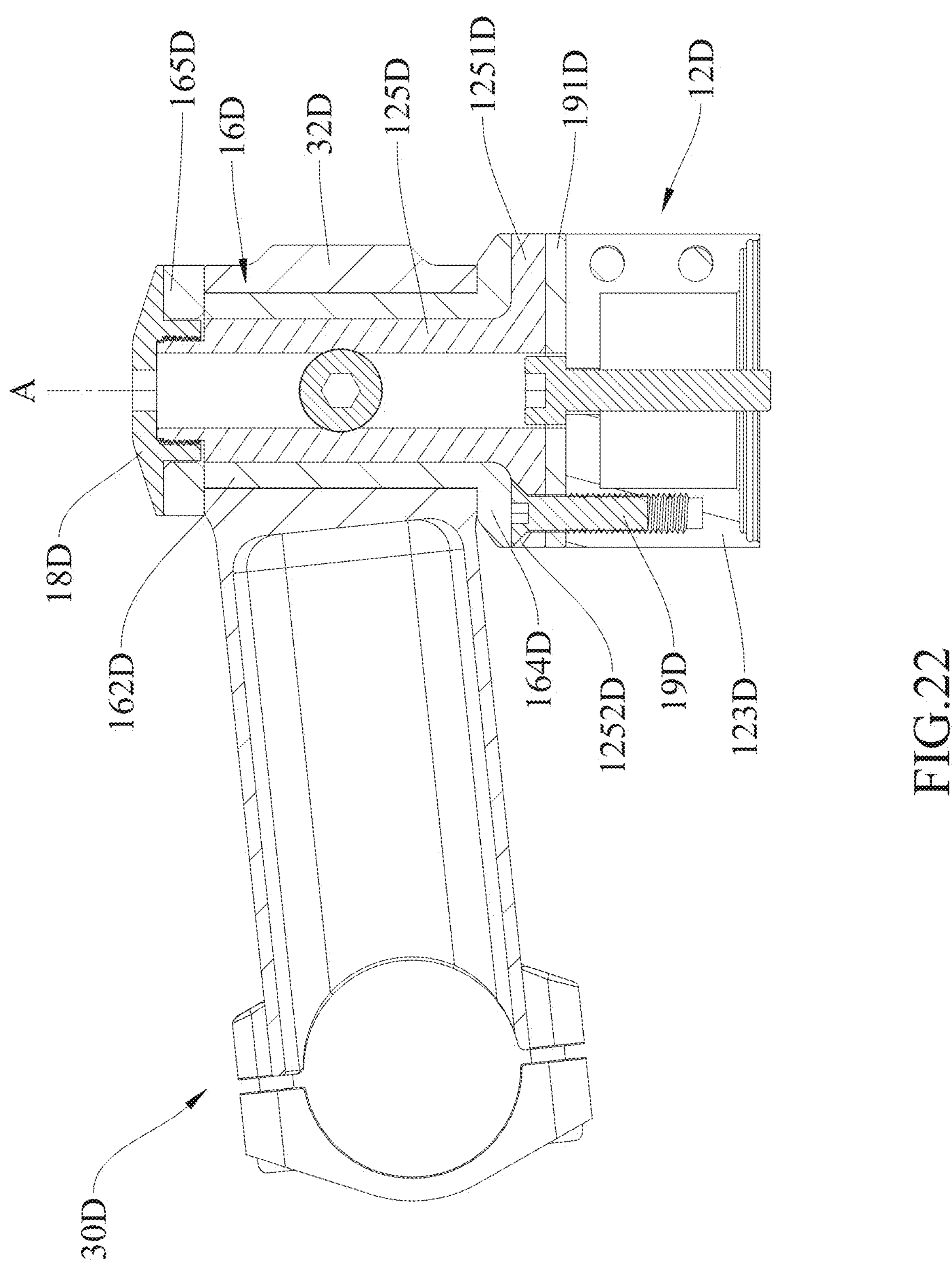
FIG. 22 is a sectional view along the 22-22 line in FIG. 21.
Figure 23:
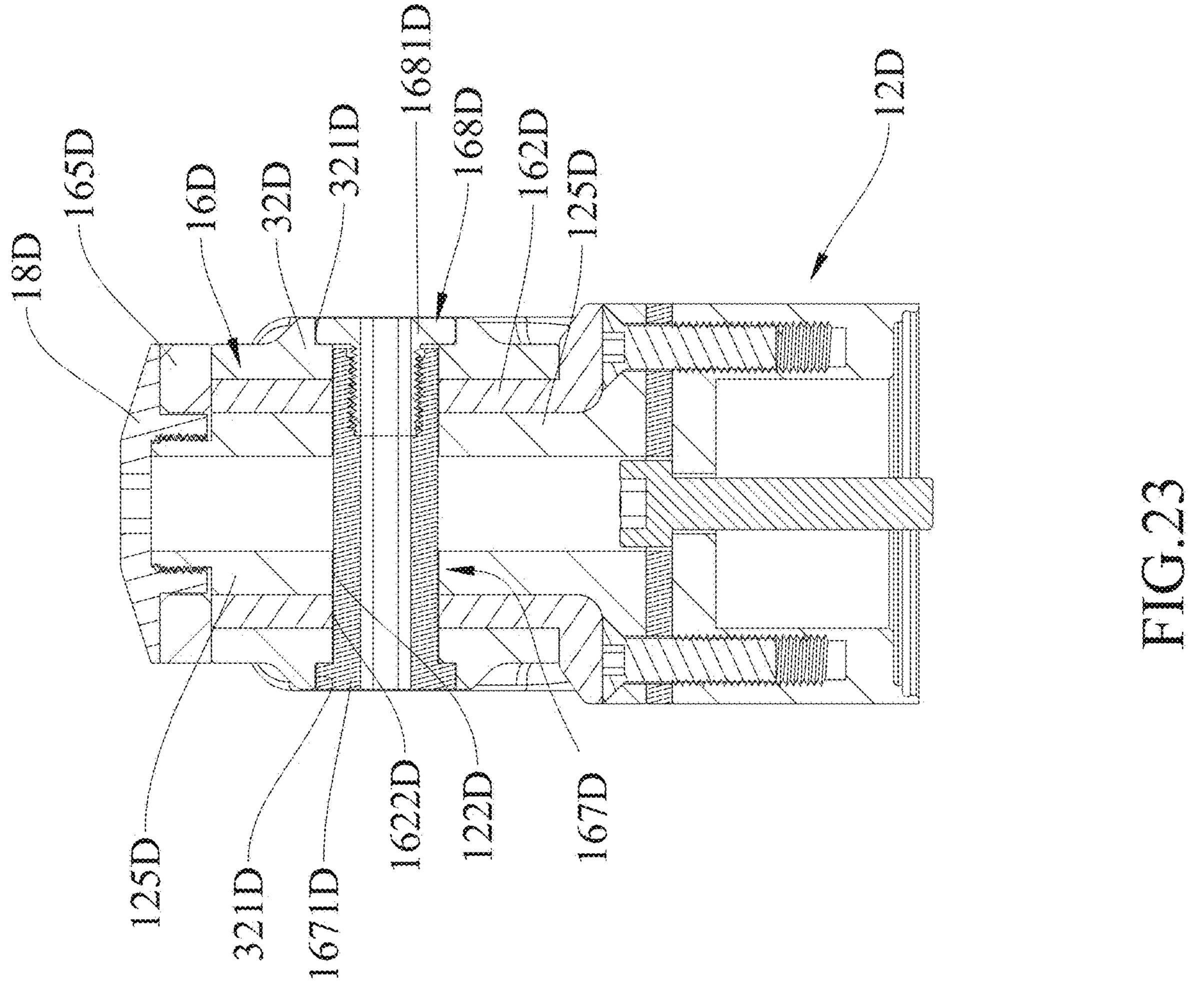
FIG. 23 is a sectional view along the 23-23 line in FIG. 21.

From the first embodiment to the fourth embodiment, the connection unit includes the first engaging portion and the second engaging portion that are integrally connected to each other as a monolithic unit. However, the first engaging portion and the second engaging portion of the connection unit could be connected to each other through screwing, riveting, or other connecting ways. A fifth embodiment of the present disclosure is illustrated in FIG. 19 to FIG. 23. A shock-absorbing device similarly includes a connection unit 12D. The connection unit 12D is connected to a damping unit 16D to jointly form the shock-absorbing device. A handlebar stem 30D working with the shock-absorbing device is provided. The handlebar stem 30D is a tube body extending along a front-rear direction. A rear end of the handlebar stem 30D has a fitting portion 32D. The fitting portion 32D fits around the damping unit 16D of the shock-absorbing device. A positioning hole 321D penetrates through the fitting portion 32D along a left-right direction.

In the fifth embodiment, the connection unit 12D includes a first engaging portion 123D and a second engaging portion 125D that are concentrically arranged along an axial direction A, wherein the second engaging portion 125D is directly engaged with the first engaging portion 123D through a plurality of fastening members 19D. More specifically, an outer diameter of the first engaging portion 123D greater than an outer diameter of the second engaging portion 125D. The second engaging portion 125D is a tube body and a bottom end of the second engaging portion 125D radially extends to form a fixing ring 1251D that is annular. The fixing ring 1251D and the first engaging portion 123D face each other. The fixing ring 1251D has a plurality of fixing holes 1252D arranged around the fixing ring 1251D. The fastening members 19D are screws. Each of the fastening members 19D passes through each of the fixing holes 1252D to be screwed with the first engaging portion 123D, so that the first engaging portion 123D and the second engaging portion 125D are engaged to form the connection unit 12D.

The damping unit 16D mainly includes a main body 162D, a fixing pin 167D, an engaging member 168D, and a top ring 165D. A bottom end of the main body 162D radially extends to form a flange 164D that is annular. When the damping unit 16D fits around the connection unit 12D, the main body 162D of the damping unit 16D encloses an outer side of the second engaging portion 125D of the connection unit 12D, and the flange 164D abuts against the fixing ring 1251D of the connection unit 12D. The second engaging portion 125D of the connection unit 12D has a first through hole 122D and the main body 162D of the damping unit 16D has a second through hole 1622D, wherein the first through hole 122D and the second through hole 1622D face each other along a straight line. The positioning hole 321D of the handlebar stem 30D faces the second through hole 1622D and the first through hole 122D along the straight line. In this way, the fixing pin 167D could pass through the positioning hole 321D of the handlebar stem 30D, the second through hole 1622D of the damping unit 16D, and the first through hole 122D of the connection unit 12D in sequence. An end of the fixing pin 167D is engaged with the engaging member 168D and the fixing pin 167D has the same function as the pin 166 in the first embodiment. In this way, the damping unit 16D could be steadily positioned on the connection unit 12D and the fitting portion 32D on the rear end of the handlebar stem 30D could fit around the main body 162D of the damping unit 16D for fixing. Therefore, the handlebar stem 30D could not rotate relative to the connection unit 12D or the damping unit 16D around the axial direction A, so that the handlebar stem 30D, and the connection unit 12D, and the damping unit 16D are combined to be a monolithic unit.

In the fifth embodiment, a cushioning pad 191D could be clamped between the fixing ring 1251D of the second engaging portion 125D and the first engaging portion 123D. By providing the cushioning pad 191D, the shock-absorbing effect of the connection unit 12D could be enhanced. In the current embodiment, two sides of the positioning hole 321D are counterbores; the fixing pin 167D is a bolt and has a first tool end 1671D; the engaging member 168D is a nut and has a second tool end 1681D. In this way, the engaging member 168D could be screwed with and fixed to the fixing pin 167D, and the first tool end 1671D and the second tool end 1681D are disposed on the handlebar stem 30D by fitting into the two sides of the positioning hole 321D. The top ring 165D fits around the connection unit 12D and abuts against a top edge of the main body 162D. The top ring 165D and a top cover 18D engaged with a top end of the connection unit 12D abut against each other. When the handlebar stem 30D is mounted on the shock-absorbing device, the fitting portion 32D on the rear end of the handlebar stem 30D fits around the damping unit 16D for fixing and the fitting portion 32D is not in direct contact with the connection unit 12D, so that the direct transmission of the vibration could be prevented, thereby enhancing the comfortability and the safety of the bicycle.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A shock-absorbing device for a fork of a bicycle, comprising a damping unit and a connection unit, wherein the damping unit comprises a main body extending along an axial direction; the main body is engaged with a handlebar stem of the bicycle; the connection unit has a first engaging portion and a second engaging portion; the first engaging portion is adapted to engage with the fork of the bicycle, and the second engaging portion is adapted to engage with the damping unit.

2. The shock-absorbing device as claimed in claim 1, wherein the first engaging portion encloses the fork; the first engaging portion has a fastening portion adapted to engage with a fastening member for fastening the first engaging portion to the fork.

3. The shock-absorbing device as claimed in claim 2, wherein an inner diameter of the first engaging portion is greater than an inner diameter of the second engaging portion; an outer surface of the main body is provided with a flange extending radially outward; the flange at least partially covers the first engaging portion.

4. The shock-absorbing device as claimed in claim 1, wherein the second engaging portion has a first through hole; the main body has a second through hole corresponding to the first through hole; after the main body is engaged with the second engaging portion, a pin passes through the first through hole and the second through hole to engage the damping unit with the connection unit.

5. The shock-absorbing device as claimed in claim 4, wherein the pin is provided with a screw hole; a top cover is disposed on a top end of the connection unit; a bolt of the top cover is screwed with the screw hole to fix the top cover to an end of the second engaging portion.

6. The shock-absorbing device as claimed in claim 4, wherein the pin comprises a fixing pin and an engaging member; an end of the fixing pin is engaged with the engaging member; the engaging member abuts against the main body.

7. The shock-absorbing device as claimed in claim 4, the pin comprises a fixing pin and an engaging member; the fixing pin is engaged with the engaging member; the fixing pin has a first tool end; the engaging member has a second tool end; the first tool end and the second tool end are disposed on the handlebar stem.

8. The shock-absorbing device as claimed in claim 1, wherein a material of the damping unit is different from a material of the connection unit.

9. The shock-absorbing device as claimed in claim 8, wherein either the material of the damping unit or the material of the connection unit is non-metal.

10. The shock-absorbing device as claimed in claim 8, wherein an elastic modulus of the damping unit is different from an elastic modulus of the connection unit; the elastic modulus of the damping unit is greater than the elastic modulus of the connection unit.

* * * * *